(12) United States Patent
Yamada

(10) Patent No.: US 6,665,274 B1
(45) Date of Patent: Dec. 16, 2003

(54) COMMUNICATION CONTROL UNIT

(75) Inventor: Kenshin Yamada, Tokyo (JP)

(73) Assignee: NEC Corporation, Toyko (JP)

( * ) Notice: Subject to any disclaimer, the term of this patent is extended or adjusted under 35 U.S.C. 154(b) by 721 days.

(21) Appl. No.: 09/590,185

(22) Filed: Jun. 9, 2000

(30) Foreign Application Priority Data

Jun. 9, 1999 (JP) .......................................... 11-162551

(51) Int. Cl.[7] .............................................. H04L 12/28
(52) U.S. Cl. ...................................... 370/256; 370/392
(58) Field of Search ................................ 370/256, 352, 370/392, 408, 474

(56) References Cited

U.S. PATENT DOCUMENTS 6,452,908 B1 * 9/2002 Yamada et al. ............. 370/256

* cited by examiner

Primary Examiner—Salvatore Cangialosi
(74) Attorney, Agent, or Firm—Foley & Lardner

(57) ABSTRACT

A communication control unit is provided which is capable of retrieving a path regardless of a length of an address to be retrieved, of reducing a scale of its circuit, of achieving a high speed processing of retrieval and of preventing an increase in memory size required. The communication control unit is composed of a retrieval data managing circuit adapted to represent a node of a path tree corresponding to a path table by a split address obtained by setting-off a real address by one byte and a split mask length and to produce an address comparison byte composed of four stages obtained by setting-off a retrieving address by one byte and a next node selection byte, a nex-node selecting circuit adapted to decide a node to be retrieved next based oil the next node selection byte and a path retrieving circuit adapted to compare valid address portion showing a split mask length out of the split address with a split mask length portion of the address comparison byte.

12 Claims, 25 Drawing Sheets additional pattern 1 additional pattern 2 additional address/mask length
81000000/8 additional address/mask length
81214000/20 additional pattern 3 additional address/mask length
40800000/12 deletion pattern 1

*deletion pattern 2*

*deletion pattern 3* deletion pattern 4

COMMUNICATION CONTROL UNIT

BACKGROUND OF THE INVENTION

1. Field of the Invention

The present invention relates to a path retrieving circuit operated to decide a device to which a packet is to be transferred based on information about a destination address to specify a receiving unit of the packet, a communication control unit such as a router employing the above path retrieving circuit or a like and more particularly to the path retrieving circuit required to solve a problem of conformity between an IP (Internet Protocol) address being used in the Internet and a network address defined by an address and a mask strength and the communication control unit using the above path retrieving circuit.

2. Description of the Related Art

Communication control units such as a bridge or a router used to pass on packet data between two or more networks, for example, between LANs (Local Area Network) are well known. The bridge establishes a connection at a level of a data link layer in a reference model of an OSI (Open Systems Interconnection) designated by ISO (International Organization for Standard). Moreover, the router establishes a connection at a level of a network layer being an upper layer of the data link layer.

Conventionally, path table information is preliminarily set in the communication control unit such as bridges, routers or a like. The communication control unit, when receiving packet data through the network, is operated to judge a place to which the received packet data is to be transferred in accordance with the path table information. In this processing of the judgement, in general, a path table is retrieved based on an address stored in an address field of the received packet data and to which device the received packet data is to be transferred is then judged.

Next, an example of the retrieving using an address employed in the LAN will be explained below briefly.

The address used in the LAN includes an MAC (Medium Access Control) address on an ethernet network, an address specific to a unit such as an ATM (Asynchronous Transfer Mode) device in an ATM network, a network number used among these communication devices, a network address representing a unit number on the network or a like.

The sending and receiving data transmitted at a level of the network layer in the LAN ordinarily includes an internet work address to identify a destination address and source address. An IP address (32 bits) in a TCP/IP (Transmission Control Protocol/Internet Protocol) is well known as the internet work address.

The router is operated, by referencing to a destination IP address of the received packet, to judge to which router or terminal the received packet is to be transmitted in the processing of the judgement, after having judged to which network address the destination IP address of the received packet belongs and to decide a physical address of the destination address corresponding to the network address.

The network address is defined by the IP address and a mask length. The mask length is information showing up to which bit from a high order bit is valid as the network address in the IP address.

An example of the network address is shown in FIG. 30. In the example in FIG. 30, since the mask length is 16 bits, high order 16 bits out of the IP address [800A0000] are valid as the network address. If the mask length is "16", the mask address is defined as [FFFF0000] with the high order 16 bits representing "1" and with low order 16 bits representing "0". When a result obtained by ANDing the destination IP address of the received packet and the above mask address conforms to the IP address [600A0000], the destination IP address is judged to have conformed to the network address.

For example, if the destination IP address is [800A40C8], a result obtaining by ANDing the destination IP address [800A40C8] and the mask address [FFFF0000] is [800A0000]. This conforms to the IP address [800A0000]. Therefore, the destination IP address is judged to conform to the network address.

Conventionally, the conformity between the destination IP address and the network address has seen solved simply by using a concept of a "Class". That is, if the high order bit of the IP address is "0", the address fits into the "Class A" having its mask length being 8 bits, if the high order bit of the IP address is "10", the address fits into the "Class B" having its mask length being 16 bits and if the high order bit of the IP address is "100", the address fits into the "Class C" having its mask length being 24 bits.

However, in recent years, due to a widespread use of subnet or CIDR (Classless Internet Domain Routing), the concept of the "Class" s not used. This does not allow the network address to be simply judged from the IP address, causing much time required to judge the network address.

Moreover, in some networks employing the CIDR, there are cases in which a plurality of network addresses conforming to the destination IP address may exist in the path table. In this case, path information given by the network address having the largest mask length is employed.

As described above, the conventional communication control units including the bridge, router or like have a problem in that, when the packet data is transferred on the network having much path information, much time is required to process the path information.

Especially, in the case of transferring the packet data on the network having a plurality of network addresses matching to a specified destination address, since an algorithm for solving contents of the network address is made complicated and further much time is required to process the path information. This causes a reduction in throughput of packet transferring processing in the packet transferring unit.

In the conventional router used in the Internet, a path deciding processing for determining a device to which the packet data is to be transferred next, based on the destination IP address, is implemented by using software; that is to say, the path information to be retrieved out of much path information is implemented by the software.

Description of the Prior Invention

The inventor of the present invention has disclosed a technology capable of reducing the time required for the path solving processing in Japanese Patent Application No. Hei9-356774. As shown in FIG. 32, disclosed technology is excellent in that the path solving processing can be performed at a high speed by implementing the retrieval algorithm composed of a binary tree structure (path tree or RT0) using a hardware circuit. Details of the path tree shown in FIG. 32 are described later.

Hereafter, technology disclosed in the Japanese Patent Application No. Hei9-356774 will be described in detail.

FIG. 31 is a schematic block diagram showing configurations of a conventional communication control unit. As shown in FIG. 31, the conventional communication control unit is composed of an input/output device 1, a path retrieving circuit 2a and a path tree storing memory 3.

The input/output device 1 is a device to perform processing of a received packet, which requests the path retrieving circuit 2a to perform path information retrieving and judges a destination address of the received packet based on a result R of path information retrieving (hereinafter maybe referred to as result of retrieving) outputted from the path retrieving circuit 2a as a result of the requested retrieval.

The path retrieving circuit 2a, when receiving a retrieval requesting signal S and a destination IP address A from the input/output device 1, is operated to retrieve the path information corresponding to the destination IP address by using the path tree storing memory 3 and then to output a retrieval completion signal E and result R of retrieving to the input/output device 1.

A path table shown as Table 1 which corresponds to the path tree, as shown in FIG. 32, used for determining the place to which the packet is to be transferred is stored in the path tree storing memory 3.

TABLE 1

| Real address | Real address length | Place to be transferred to |
|---|---|---|
| 0 | 0 | Router A |
| 85.04.00.00 | 16 | Router B |
| 85.05.00.00 | 16 | Router C |
| 85.20.10.00 | 24 | Router D |

Next, the path tree shown in FIG. 32 is described below. As shown in FIG. 32, the path tree is composed of a path node (nod 1) and a transit node (nod 2). Each path node (nod 1) has a path entry corresponding to each place to be transferred to. The transit node (nod 2) does not have the path entry and is provided as a branch node used to establish a connection among path nodes (nod 1). A number given at an upper stage in a block of each node represents a node number N. A number given at the front of a slash [/] out of lumbers at a lower stage in a block represents an IP address (real address) and a number at the rear of the slash [/] represents a mask length (real mask length).

Thus, the path tree corresponding to the path table is so configured that an unnecessary branch is removed in order to achieve high speed retrieving. As depicted in Table 1 and FIG. 32, the node of the path tree has larger mask lengths at its farther ends of the tree structure. Because of this, the mask length of the node becomes larger as the node is read later.

FIG. 33 is a schematic block diagram showing configurations or the conventional path retrieving circuit 2a. As shown in FIG. 33, the path retrieving circuit 2a is chiefly includes a state managing circuit 1023, a next node selecting circuit 1020 which performs retrieving processing for every node, a path renewing circuit 1021 and a retrieving end judging circuit 1022.

The next node selecting circuit 1020 is provided with a decoding circuit (not shown) to select one bit and, when retrieving the path, is operated to extract one bit of the retrieving IP address from the mask information in a cycle of one clock and then to select to which node, a left child node or a right child node of the tree structure, the path should be branched. This allows one entry processing (one node processing) to be implemented in the cycle of one clock. At this point, the processing of selecting one bit of the address to decide the branching to a next node and processing of comparing the address with the network address held by the node are performed on all bits of the address.

Moreover, the path renewing circuit 1021 has an address comparing circuit (not shown) which performs a comparison between the IP network address designated by the mask length cut of IP addresses of the read node and the retrieving IP address. When the results from the comparison conform to each other, the path information of the read node is held. The comparison between the retrieving IP address and the network address held by the node is made for all bit widths.

The retrieving end judging circuit 1022 judges the retrieving processing to be terminated when the rode to be next read by the next node selecting circuit 1020 does not exist or when the results from the comparison do not conform to each other. Immediately when retrieving is judged to be terminated, the path information held lastly by the path renewing circuit 1021 becomes path information that can correspond to the retrieving IP address. The information about termination of the retrieving is notified to the input/output device 1.

The technology disclosed in Japanese Patent Application No. Hei9-356774 is excellent in that time required for processing of determining the path is shortened because the path retrieving is implemented by the hardware circuit not by algorithm.

However, though the path retrieving is implemented by the hardware circuit, it still has points to be technologically improved. In the conventional path retrieving, since the length of an address to be retrieved is predetermined, it is impossible to retrieve the address if its length is greater than the predetermined one. In the conventional technology, in order to retrieve very long address, the decoding circuit to select the bit and the address comparing circuit have to be made large-scaled so that they can treat big bit numbers.

Moreover, whenever processing for every entry is performed, processing of comparing by the number of bits of the address is required. Because of this, if the address to be retrieved is long, much time is required to retrieve each entry. As a result, when one entry is retrieved in a cycle of one clock, if the number of bits of the address to be retrieved increases, since it is difficult to shorten the clock cycle and an operational clock frequency has to be lowered, the processing speed is lowered accordingly.

When the hardware circuit being capable of retrieving the very long address is fabricated, it is necessary to express each node of the path tree by using a long address. This causes an increase in capacity of the memory required to store the retrieving table corresponding to the path tree.

SUMMARY OF THE INVENTION

In view of the above, it is an object of the present invention to provide a communication control unit which is capable of retrieving a destination regardless of length of an address to be retrieved, of reducing a size of a circuit of the communication control unit, of achieving a high speed processing of retrieval and of preventing an increase in a memory capacity.

According to a aspect of the present invention, there is provided a communication control unit including:

a memory device storing a path table corresponding to a path tree used to retrieve a place to which received packet data is transferred, wherein a node constituting the path tree is represented by a split address containing a least significant bit of a valid address of a real address out of each of the split addresses obtained by setting off the real address of the node by every specified bit starting from its high order portion and by a split mask length showing a count of bits of a valid address portion of the real address;

a path retrieving circuit including a retrieval data managing circuit, a next node selecting circuit and a path renewing circuit, wherein the retrieval data managing circuit is operated to produce a split retrieving address including two or more stages obtained by setting off the retrieving address showing a destination for received packet data by every specified bit and, at a same time, to generate a bit string for selection including a bit string obtained by displacing the bit string of the split retrieving address by one bit toward a low order portion on the retrieving address, wherein the next node selecting circuit is operated to decide the node to be next retrieved based on the bit having a value being equivalent to a value of a length of high order split mask contained in the bit strings for selection and wherein the path renewing circuit is operated to compare a valid address portion being equivalent to the count of bits represented by the length of the high order split mask contained in split addresses showing the node decided by the next node selecting circuit with the bit string being equivalent to the count of bits represented by the length of the high order split mask contained in split retrieving addresses outputted from the retrieval data managing circuit and if comparison results conform to each other, to hold path information corresponding to the node and to output path information being held at a time of termination of the retrieving processing as a place to which the received packet data is to be transferred.

By configuring as above, each node of the path tree is represented by the split address, split mask length and the address to be retrieved is also split, the split retrieving address is produced and the split bit strings are sequentially compared with each other. Therefore, the place to which the packet is transferred can be retrieved regardless of the length of the address to be retrieved, that is, the retrieving address may be a variable-length address. Moreover, a memory capacity required to store data of the node can be reduced more when compared with a case wherein each node is represented by the real address or real mask length. Even when the address entered is long, since the split address is stored as data of the node, an increase in memory capacity can be avoided. Furthermore, the processing of retrieving the node is performed by splitting the retrieving address. This allows each node to be retrieved depending on a scale or a circuit corresponding to the count of bits of the split retrieving address. Therefore, configurations of the circuit can be made smaller in scale when compared with the case where the node is retrieved based on the real address or real mask length. Even if the retrieving address is long, each node can be retrieved depending on scale of the circuit corresponding to the count of bits of the split retrieving address. This can prevent an increase in the scale of configurations of the circuit. Since the node represented by the split address and split mask length is retrieved based on the split retrieving address, the count of bits to be retrieved for each node can be reduced more when compared with the case in which the retrieving is performed based on the actual retrieving address, thus allowing high speed retrieving of the node. Also, since the count of bits of each node to be retrieved can still remain the court of bits of the split retrieving address, even when the retrieving address is long, time required to retrieve each node can be shortened, thus allowing high speed retrieving.

In the foregoing, a preferable mode is one that the path tree corresponding to the path table stored in the memory device has the node with its split mask length being equivalent to the specified count of bits on the path establishing the connection. among nodes represented by different split bit strings and wherein the retrieval data managing section, when the node to be compared in the path renewing circuit is renewed from the node with the split mask length being equivalent to the specified number of bits to the next node, is operated to update the split retrieving address and the bit string for selection to be outputted to the path renewing circuit so as to exist at a next stage.

By configuring as above, since the split retrieving address is updated every time the split mask length becomes a specified count of bits, when the split address showing the node and the split retrieving address serving as a retrieve key are referenced to, the split address and split retrieving address can be compared surely between bit strings corresponding to each other.

Also, a preferable mode is one wherein the node includes a path node corresponding to path information showing the place to which the packet data is to be transferred, a transit node not corresponding to path information, having the split mask length being equivalent to a value being less than the specified number of bits and serving as a branch point between two nodes and a boundary node not corresponding to path information, having the split mask length being equivalent to the specified number of bits and not serving as the branch point.

By configuring above, since the path tree includes three kinds of boundary nodes including the path node, transit node and boundary node, efficient retrieving of the path can be achieved by using minimum necessary number of nodes.

Also, a preferable mode is one that wherein includes a mask length comparing circuit operated to compare the real mask length showing the valid address of the retrieving address and the count of bits of the valid address of the real address of the node to be retrieved.

By configuring as above, a state that the valid address of the retrieving address serving as a reference or judgement of termination of the retrieving becomes longer than the valid address of the real address of the node to be retrieved can be easily detected.

Also, a preferable mode is one that wherein includes a retrieval end identifying circuit operated to judge the retrieving to be terminated when there is no next node to be selected in the next node selecting circuit, when comparison results do not conform to each other in the path renewing circuit or when the valid address of the retrieving address is longer than the valid address of the real address of the node to be retrieved.

By configuring as above, the termination of retrieving can be easily judged.

Also, a preferable mode is one wherein the next node selecting circuit includes a first selector operated to select the bit represented by the split mask length out of the specified number of bits and a second selector operated to select one node as the next node out of maximum two nodes based on a value of the bit selected by the first selector.

By configuring as above, when the retrieval processing is implemented by hardware, the count of bits such as the register, decoder or a like constituting the first selector can be limited to the count of bits of the split address or split mask length. This allows a reduction of the circuit scale even in the case of long retrieving address.

Also, a preferable mode is one wherein the path renewing circuit includes a mask processing circuit into which the split mask length of the split address showing the node decided by the next node selecting circuit and the split retrieving address are inputted and which is operated to extract the bit string being equivalent to the count of bits represented by the split mask length from the high order portion of the split retrieving address, an address comparing circuit operated to compare the extracted bit string with the valid address portion being equivalent to the count of bits represented by the split mask length out of the high order portion of the split address and a path information renewing circuit operated to hold path information corresponding to the node if the comparison results conform to each other and to output path information held at time of termination of the retrieving as the place to which the received packet data is to be transferred.

By configuring as above, the retrieval processing can be implemented by circuits corresponding to the count of bits of the split retrieving address or split mask length, thus preventing increase in circuit configurations even if the retrieving address is long.

Also, a preferable mode is one that wherein includes an entry adding circuit operated to add the node of an additional entry to the place retrieved as an additional position by the path retrieving circuit in the path tree.

Furthermore, a preferable mode is one that wherein includes an entry deleting circuit operated to delete the node corresponding to the place retrieved as a deletion position by the path retrieving circuit in the path tree.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Figure 2:
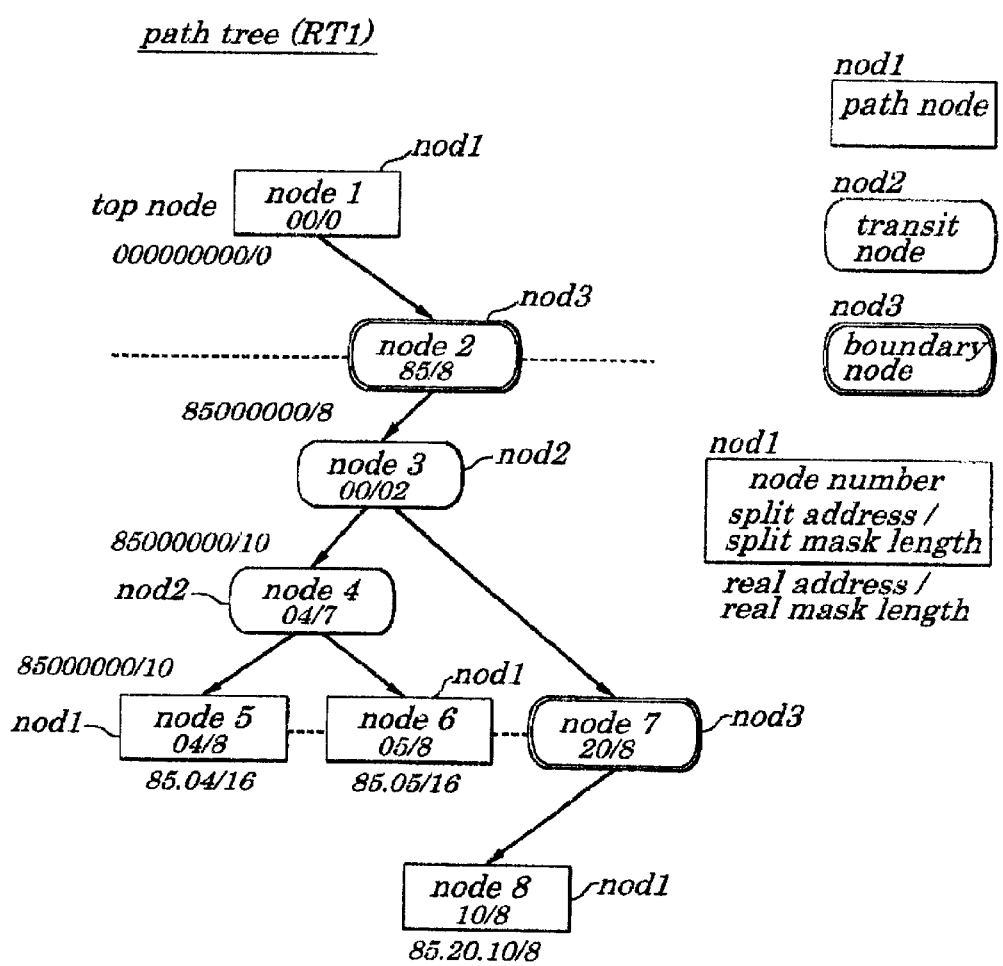
FIG. 2 is a diagram explaining a path tree according to the first embodiment of the present invention.

(RT1) shown in FIG. 2 which is used for retrieving a next place to which the received packet data is transferred, in which the information of each node constituting the path tree (RT1) is provided. The path retrieving circuit 2 performs retrieving in accordance with the path table shown in Table 2.

Moreover, the path table shown in Table 1 may be stored in a memory other than the path tree storing memory 3.

TABLE 2

| Node number N | Node data | | | | | Actual Ip network address | | Node type |
|---|---|---|---|---|---|---|---|---|
| | (Da) 8 bit | (Db) 3 bit | (Dc) 18 bit | (Dd) 18 bit | (De) 1 bit | Real address 32 bit | Real mask length 6 bit | |
| 1 | 00 | 0 (=8) | None | 2 | Valid | 00000000 | 0 | Path node |
| 2 | 85 | 8 | 3 | None | Invalid | 85000000 | 8 | Boundary node |
| 3 | 00 | 2 | 4 | 7 | Invalid | 85000000 | 10 | Transit node |
| 4 | 04 | 7 | 5 | 6 | Invalid | 85040000 | 15 | Transit node |
| 5 | 04 | 8 | None | None | Valid | 85040000 | 16 | Path node |
| 6 | 05 | 8 | None | None | Valid | 85050000 | 16 | Path node |
| 7 | 20 | 8 | 8 | None | Invalid | 85200000 | 16 | Boundary node |
| 8 | 10 | 8 | None | None | Valid | 85201000 | 24 | Path node |

First Embodiment

Figure 1:
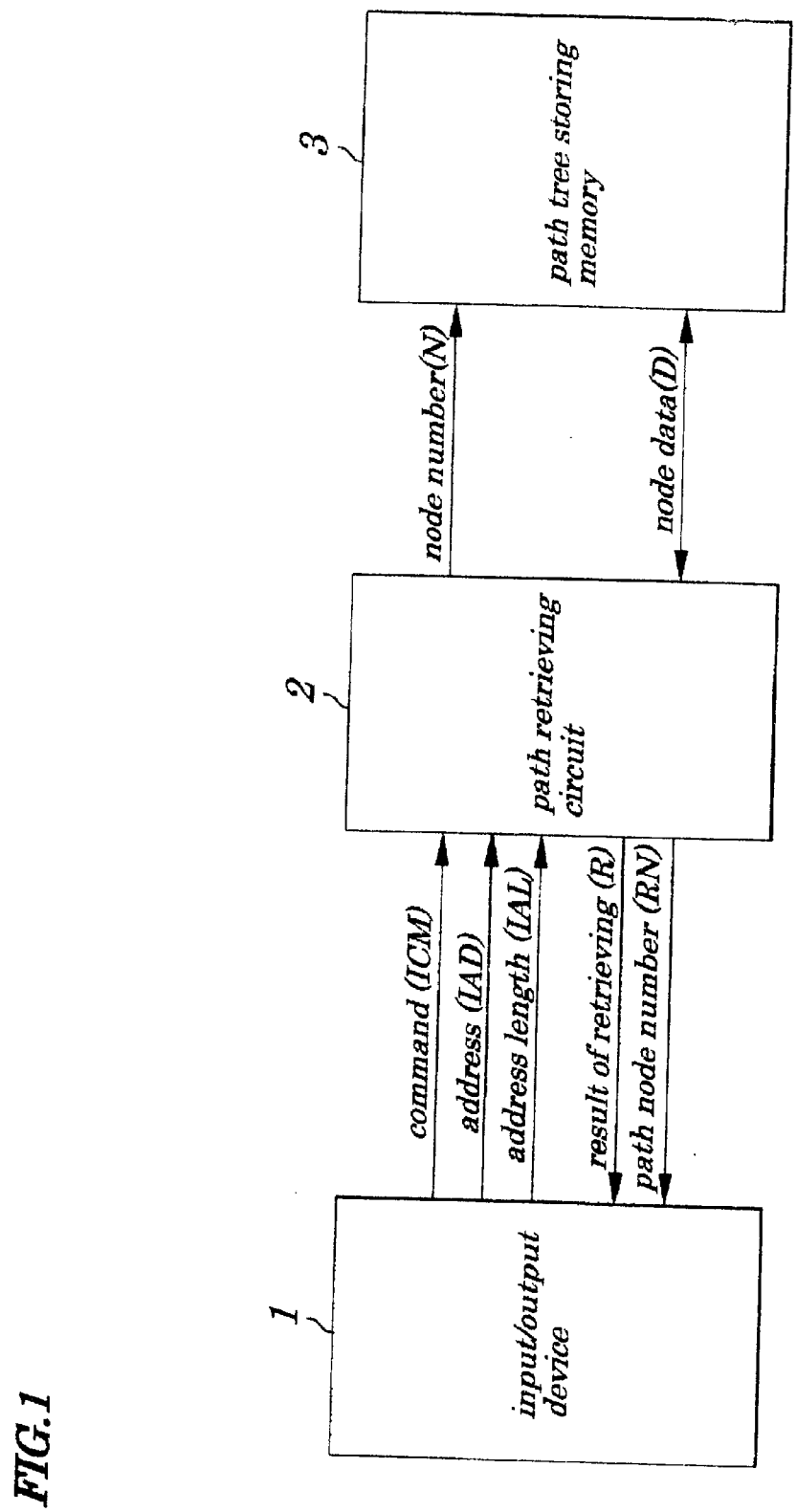
FIG. 1 is a block diagram showing configurations of a communication control unit according to a first embodiment of the present invention.

FIG. 1 is a schematic block diagram showing configurations of a communication control unit according to a first embodiment of the present invention, in which the communication control unit is, for example, a router mainly including an input/output device 1, a path retrieving circuit 2 and a path tree storing memory 3.

The input/output device 1 is a device adapted to process a received packet, which is composed of a CPU (Central Processing Unit) (not shown), a special purpose packet processing hardware circuit (not shown) or a like. The input/output device 1 requests the path retrieving circuit 2 to retrieve path information and then determines a place to which the received packet is to be transferred based on path information R outputted from the path retrieving circuit 2. Moreover, the input/output device 1 is the device adapted to manage a path table and, when a change occurs in the path table, as described above, requests the path retrieving circuit 2 to add and delete the path information to renew the existing path table.

The path tree storing memory 3 is preferably an SRAM (Static Random Access Memory) which can provide a high speed reading and writing. A large capacity high speed memory block is preferably mounted in a same LSI (Large Scale Integrated Circuit) as the path retrieving circuit 2 if both can be implemented within the LSI. By configuring like this, the circuit can be made small-sized and its processing speed can be greatly improved.

In the path tree storing memory 3 are stored the path table shown in Table 1 and a retrieving path table shown in Table 2. The path table shown in Table 2 corresponds to a path tree By referring to FIG. 2, configurations of the path tree (RT1) corresponding to the path table shown in Table 2 will be described below. The node constituting the path tree (RT1) is expressed by a split address containing a least significant bit of a valid address in a real address out of split addresses obtained by splitting an entry address (real address) of this node into a high order 8 bits (1 byte) and by a split mask length representing a number of bits of the valid address contained in the split address. Because of this, only an address portion to be retrieved out of the real address may be stored in the path table as the information of each node constituting the path tree (RT1). That is, according to the present invention, the split address call be expressed in 8 bits (1 byte), regardless of length of the real address, and the split mask length can be expressed in 3 bits.

In contrast, in conventional technology, for example, in a case of retrieval of an address of the host path in accordance with IPv4 (Internet Protocol version 4), it is necessary to secure 32 bits of memory capacity for an address length and 5 bits of memory capacity for mask length of every node. Also, in the case of the retrieval of the address of the host path in accordance with IPv6 (Internet Protocol version 6), it is necessary to secure 128 bits of memory capacity for the address length and 7 bits of the memory capacity for the mask length of every node.

Therefore, in the path table shown in FIG. 2, a width of the address of each node stored in the path tree storing memory 3 can be reduced to 8 bit width and its mask length can be reduced to 3 bit length. This allows the memory capacity required to store the whole path table to be greatly reduced.

Moreover, the path tree (RT1) shown in FIG. 2 differs from a conventional path tree (RT0) (FIG. 32) in that a new boundary node (nod3) is added. That is, the path tree (RT1) shown in FIG. 2 is composed of three types of nodes including a path node (node, a transit node (nod2) and the boundary node (nod3). The path node represents the node corresponding to path information showing the place to which packet data is to be next transferred. The transit node represents the node serving as a branch point for two nodes, which does not correspond to the path information. According to the embodiment, the split mask length of each transit node is less than 8 bits. Nodes (up to max. two nodes) branching downward from the node are called child nodes. The node not corresponding to path information and having no child node does not exist.

The boundary node is a node which does not correspond to the path information and not serving as the branching point. According to the embodiment, a split mask length (Db) of each boundary node is 8 bits.

If, however, the path node or the transit node exists at a position where the boundary node has to be inserted originally, insertion of the boundary node is not required. In this case, the path node or transit node serves as the boundary node. Therefore, in the path tree (RT1) shown in FIG. 2, the node having the split mask length being 8 bits exists on the path connecting one node with another, each of which is expressed by split bit strings being different from each other. When the retrieve processing is performed in units of bytes, the 8 bits used as the split mask length of the node such as the boundary node indicate that the byte to be retrieved is switched to a next byte.

Next, a relationship between configurations of the path tree (RT1) shown in FIG. 2 and those of the path tree (RT0) shown in FIG. 32 will be described.

Figure 32:
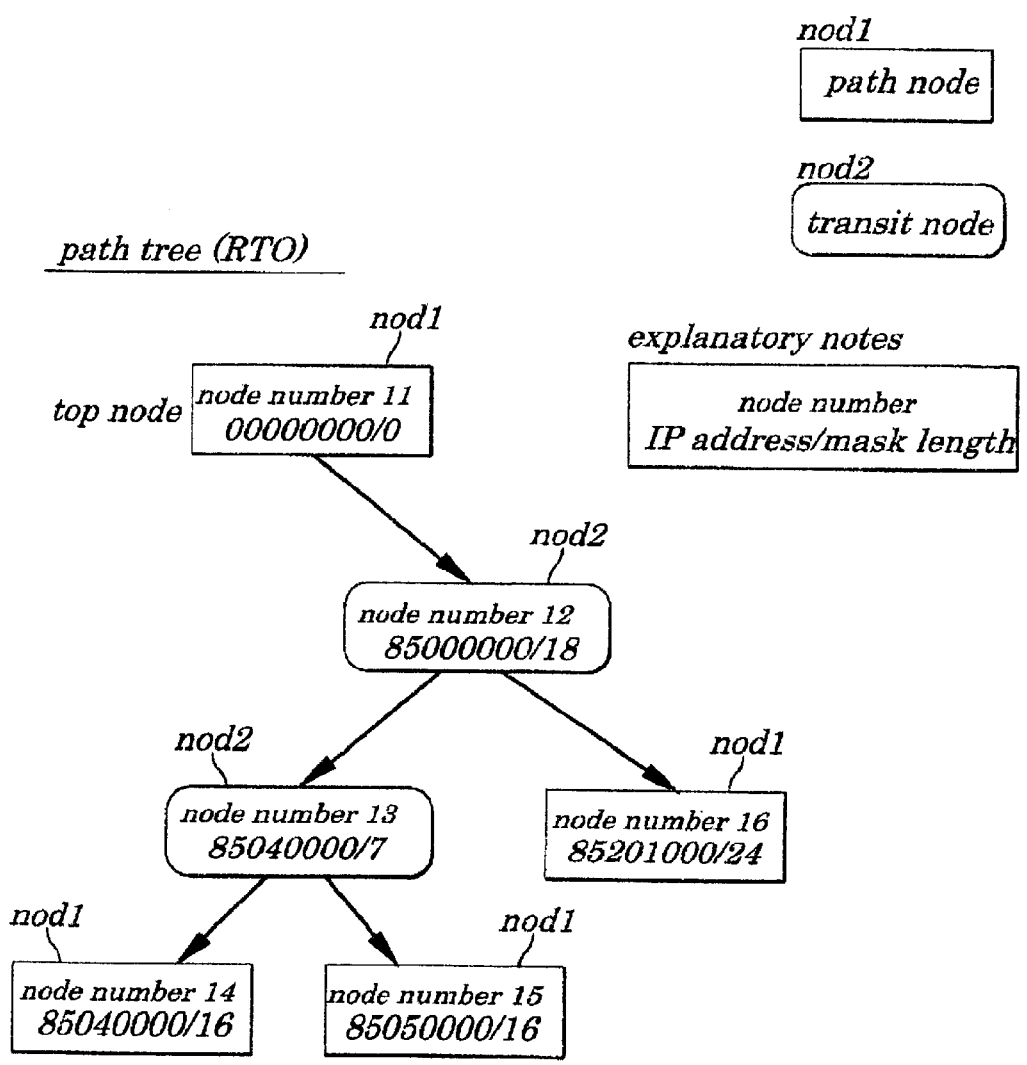
FIG. 32 is a diagram explaining a conventional path tree.
Figure 33:
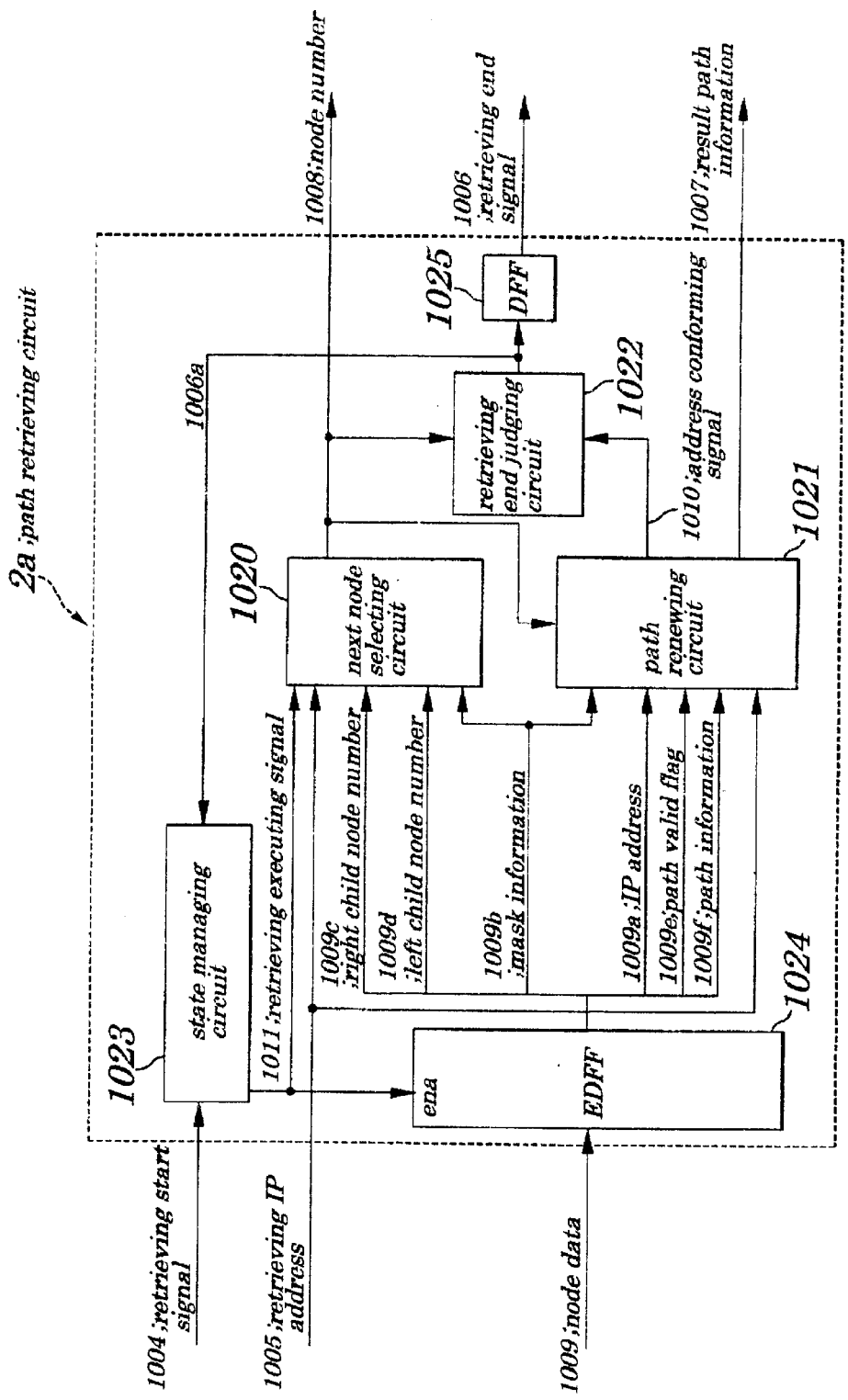
FIG. 33 is a schematic block diagram showing configurations of a path retrieving circuit.

A No. 11 node in the path tree (RT0) shown in FIG. 32 is equivalent to a No. 1 node in the path tree (RT1) shown in FIG. 2. A No. 12 node in the path tree (RT0), is equivalent to a No. 3 node in the path tree (RT1). No. 13 node in the path tree (RT0) is equivalent to a No. 4 node in the path tree (RT1). A No. 14 node in the path tree (RT0) is equivalent to a No. 5 node in the path tree (RT1). A No. 15 node in the path tree (RT0) is equivalent to a No. 6 node in the path tree (RT1). A No. 16 node in the path tree (RT0) is equivalent to a No. 8 node in the path tree (RT1).

Therefore, the path tree (RT1) looks as if the boundary node with the node number 2 is inserted between the No. 1 node and the No. 3 node in the path tree (RT0). Also, the path tree (RT1) looks as if the boundary node with the node number 7 is inserted between the No. 3 node and the No. 8 node in the path tree (RT0).

Next, configurations of the path retrieving circuit 2 shown in FIG. 1 will be described below. The path retrieving circuit 2 is a hardware circuit to obtain information about the place to which the packet is to be transferred by using an address showing the destination. Preferably, a logic circuit providing a high calculating speed such as the LSI is used as the hardware circuit. Moreover, to shorter time required for development or to reduce development costs, a PLD (Programmable Logic Circuit) may be employed as the hardware circuit. As shown in FIG. 1, to the path retrieving circuit 2 are inputted a command (ICM), an address (IAD) and an address length (IAL) from the input/output device 1. The command (ICM) includes three types of the commands composed of requests for retrieving, for adding, and for deleting.

That is, if the command (ICM) is a request for retrieving, a path entry corresponding to the address (IAD) and the address length (IAL) is retrieved. If the command (ICM) is a request for adding, processing of adding the path entry corresponding to the address (IAD) and the address length (IAL) is performed. If the command (ICM) is a request for deleting, processing of deleting the path entry corresponding to the address (IAD) and the address length (IAL) is performed.

Thus, the path retrieving circuit 2, at every time of performing each of the above processes, is operated to output a result (R) of execution and a path node number (RN) of results corresponding to the path entry, to the input/output device 1.

Moreover, the path retrieving circuit 2, when performing the retrieving processing, obtains node data (D) by inputting node number N to the path tree storing memory 3 and compares the address (IAD) with node data (D). According to the embodiment, the address to be retrieved is set off by one byte (fixed length) and, in each of the above processing on the node, the processing is performed only on a specified byte of the address.

Furthermore, as described later, the path retrieving circuit 2, by inputting the node number N and the node data (D) to the path tree storing memory 3, can update the path table stored in the memory 3.

Hereinafter, in prior to descriptions of examples configurations and operations of the path retrieving circuit 2 of the embodiment, in order to provide a clear understanding of the invention, a path retrieving algorithm employed in the present invention will be explained by taking the case or retrieving the IPv4 address as example.

The path retrieving circuit 2, when retrieving the path tree (RT1), is adapted to set off the retrieving address by one byte and to perform the processing in units of bytes. Therefore, the address length of each node in the path tree (RT1) is 8 bits and the mask length is a value obtained by taking a value of "8" from "1". However, in the path tree (RT1), though the mask length of a top node is exceptionally "0" (zero), the split mask length (Db) being "8" is stored for the node data (D) stored in the path tree storing memory 3. The path retrieving circuit 2 is adapted to perform processing for every node in one cycle. It retrieves the path number to be employed, while reading, in each cycle, the node data (D) from the path tree storing memory 3.

The processing performed in each cycle is mainly composed of four types of processing including "next node selection processing", "address comparison processing", "retrieval end judgement processing" and "address comparison byte and next node selection byte renewal processing".

First, the next node selection processing out of the above four types of processing will be described.

In the next node selection processing, one bit of retrieving IP address is selected from the split mask length (Db) of the node data (D) read from the path tree storing memory 3. Then, in accordance with a value of the above selected bit, selection is made as to which node is read, a right child node or a left child node. The right child node represents the node which is located in a right link when the node is branched to the next node. The left child node represents the node which is located in a left link when a node is branched to the next node.

In the path retrieving circuit 2 of the present invention, the retrieving processing of each node is performed in units of bytes. Because of this, 8 bits of the byte for selection of the next node are taken out from the retrieving IP address and then one bit is taken out from the byte for selection of the next node. In contrast, in the conventional technology, one bit is selected from the mask length contained in all bits (32 bits) of the retrieving IP address.

If the mask length (Db) is, for example, "m", the high order m-th bit of a next node selection byte (NSB) for selection of the next node is selected. When the selected "m"-th bit value is "1", the node number of the right child node is used as the address of the node to be read next, while, when the selected "m"-th bit value is "0", the node number or the left child node is used as the address of the node to be read next.

Next, address comparison processing is briefly described below. In the address comparison processing, comparison among address (Da) of the node data (D), the split mask length (Db) and the retrieving IP address is made. Since the processing is performed in units of bytes in the path retrieving circuit 2 of the present invention, an address comparison byte (ACB) for the address comparison is taken out from the retrieving IP address. The comparing among the address comparison byte (ACB) for address comparison, the address (Da) of the node data (D) and split mask length (Db) is made.

When the split mask length (Db) is "m", bits equivalent to a high order "m" bits of the address comparison byte (ACB) for the address comparison is taken out. Whether the bits taken out as above conform to the high order "m" bits of the address (Da) is checked.

In contrast, in the conventional technology, comparison is made between 32 bits of the retrieving IP address and all bits of the network address held by the node data.

If results from the comparison conform to each other and, if the node being currently read is the path node, the number of the node obtained by the retrieval is changed to that of the node being currently read. If the results from the comparison do not conform to each other and, if the node being currently read is other than the path node, the number of the node obtained by the retrieval is held.

Next, retrieval end judgement processing is described below. In the retrieval end judgement processing, when the node to be read next does not exist in the next node selection processing or the results from the comparison do not conform to each other in the address comparison processing, the retrieval processing is judged to have been terminated. At the time of termination of the retrieval, the number of the node obtained from the retrieval held by the address comparison processing section becomes the number of the node corresponding to the retrieving IP address.

Next, a brief explanation of the address comparison byte and next node selection byte renewal processing will be given.

A byte for selection of the next node used in the next node selection processing and a byte for comparison used in the address comparison processing are set in accordance with real mask length of the node being currently read.

That is, if a value of the real mask length is "0", a value of the byte for the address comparison is set to "00" and a value for high order 7 bits of the byte for the selection of the next node is set to "0" and a value for low order 1 bit of the byte for the selection of the next node is set to the highest order bit of the retrieving IP address.

Moreover, if the real mask length is within a range of "1 to 8", values of the byte for the address comparison are set to values of high order "1 to 8" bits of the retrieving IP address and values of the byte for the selection of the next node are set to high order "2 to 9" bits of the retrieving IP address. Also, if the real mask length is within a range of "9 to 16", values of the byte for the address comparison are set to high order 9 to 16 bits of the retrieving IP address and values of the byte for the selection of the next node are set to high order "10 to 17" bits of the retrieving IP address. Also, if the real mask length is within a range of "17 to 24", values of the byte for the address comparison are set to high order 17 to 24 bits of the retrieving IP address and values of the byte for the selection of the next node are set to high order "18 to 25" bits of the retrieving IP address. Furthermore, if the real mask length is within a range of "25 to 32", values of the byte for the address comparison are set to high order "25 to 32" bits of the retrieving IP address and values of high order 7 bits of the byte for the selection of the next node are set to high order "26 to 32" bits of the retrieving IP address and values of low order 1 bit of the byte for the selection of the next node are set to "0".

Moreover, the split mask length (Db) stored in the node data (D), since the retrieving processing in units of bytes is performed, is a value obtained by converting the real mask length to any value within a range of "1 to 8". Since the retrieving processing in the path retrieving circuit 2 is performed in units of bytes, as described above, the node having the mask length being "8" always exists at a portion of a boundary of the byte of the path tree. As a result, the real mask length is the mask length of the network address corresponded by each node and given by the following formula:

(Real mask length of the node being currently read)=[Number of passed nodes each having the split mask length (Db) being "8"−1]×8+[Split Mask length (Db) of the node being now read]     (1)

In the above formula (1), the split mask length (Db) of the top node, for convenience's sake, is "8".

From the above formula (1), the following rules for setting the bytes for the address comparison byte and for the next selection can be obtained:

(i) When the number of the passage of the nodes each having the split task length (Db) being 8 is "0", the byte for the address comparison is set to "00" and high order 7 bits of the byte for the selection of the next node is set to "0" and the low order 1 byte is set to the highest order bit of the retrieving IP address.

(ii) When the number of the passage of the nodes each having the split mask length (Db) being 8 is "1", the byte for the address comparison is set to high order "1 to 8" bits of the retrieving IP address and the byte for the selection of the next node is set to high order "2 to 9" bits of the retrieving IP address.

(iii) When the number of the passage of the nodes each having the split mask length (Db) being 8 is "2", the byte for the address comparison is set to high order "9 to 16" bits of the retrieving IP address and the byte for the selection of the next node is set to high order "10 to 17" bits of the retrieving IP address.

(iv) When the number of the passage of the nodes each having the split mask length (Db) being 8 is "3", the byte for the address comparison is set to high order "17 to 24" bits of the retrieving IP address and the byte for the selection of the next node is set to high order "18 to 25" bits of the retrieving IP address.

(v) When the number of the passage of the nodes each having the split mask length (Db) being 8 is "4", the byte for the address comparison is set to high order "25 to 32" bits of the retrieving IP address and high order 7 bits of the byte for the selection of the next node is set to high order "26 to 32" bits of the retrieving IP address and low order 1 bit of the byte for the selection of the next node is set to "0".

Figure 3:
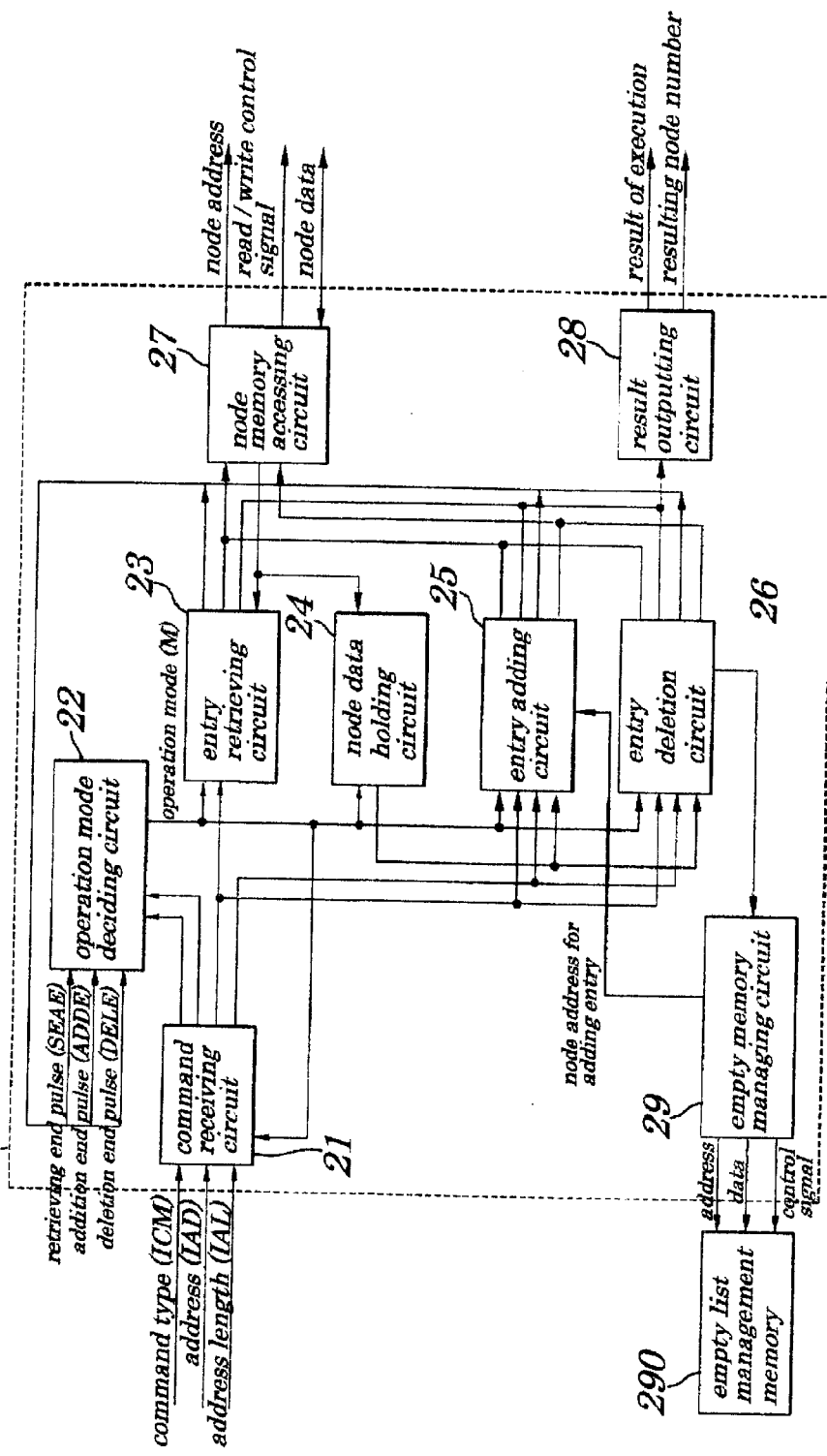
FIG. 3 is a schematic block diagram showing configurations of a path retrieving circuit according to the first embodiment of the present invention.

Hereinafter, configurations of the path retrieving circuit 2 will be described by referring to FIG. 3. FIG. 3 is a schematic block diagram showing configurations of the path retrieving circuit 2 according to the first embodiment. As shown in FIG. 3, the path retrieving circuit 2 includes a command receiving circuit 21, an operation mode deciding circuit 22, an entry retrieving circuit 23, a node data holding circuit 24, an entry adding circuit 25, an entry deleting circuit 26, a node memory accessing circuit 27 and a result outputting circuit 28.

First, operations of the command receiving circuit 21 contained in the path retrieving circuit 2 will be described. The command receiving circuit 21 receives signals including a command type (ICM), an address (IAD) and an address length (IAL) from the input/output device 1. The command type (ICM) signal includes three types or commands including a retrieving command (ICM1), an adding command (ICM2) and a deleting command (ICM3).

When command mode (CM) to be inputted to the operation mode deciding circuit 22 is in a waiting mode (M0), the command mode (CM) is set, in accordance with the command type (ICM), to any one of the retrieving command (ICM1), adding command (ICM2) and deleting command (ICM3), which are outputted to the operation mode deciding circuit 22.

At a same time, the address (IAD) is set to a target address (TAD) and the address length (IAL) is set to a target mask length (TMSK) These signals are outputted to any one of the entry retrieving circuit 23, the entry adding circuit 25 and the entry deleting circuit 26.

The above target address (TAD) and the target mask length (TMSK) can be set when the command mode (CM) is a waiting mode (M0). However, by holding input signal fed from an input/output device 1 and then by adjusting output timing of each output signal so that subsequent retrieving can be made immediately after termination of retrieving processing, a blank during the retrieving processing can be avoided, thus maintaining a level of high performance of the retrieving processing.

Next, operations of the operation mode deciding circuit 22 will be described below. The operation mode deciding circuit 22 is operated to decide an operation mode (M). This decision is made based on types of command modes (CM) inputted from the command receiving circuit 21, a current operation mode (M), a retrieving end pulse (SEAE) inputted from the entry adding circuit 25, an addition end pulse (ADDE) inputted from the entry adding circuit 25 and a deletion end pulse (DELE) inputted from the entry deleting circuit 26.

Figure 10:
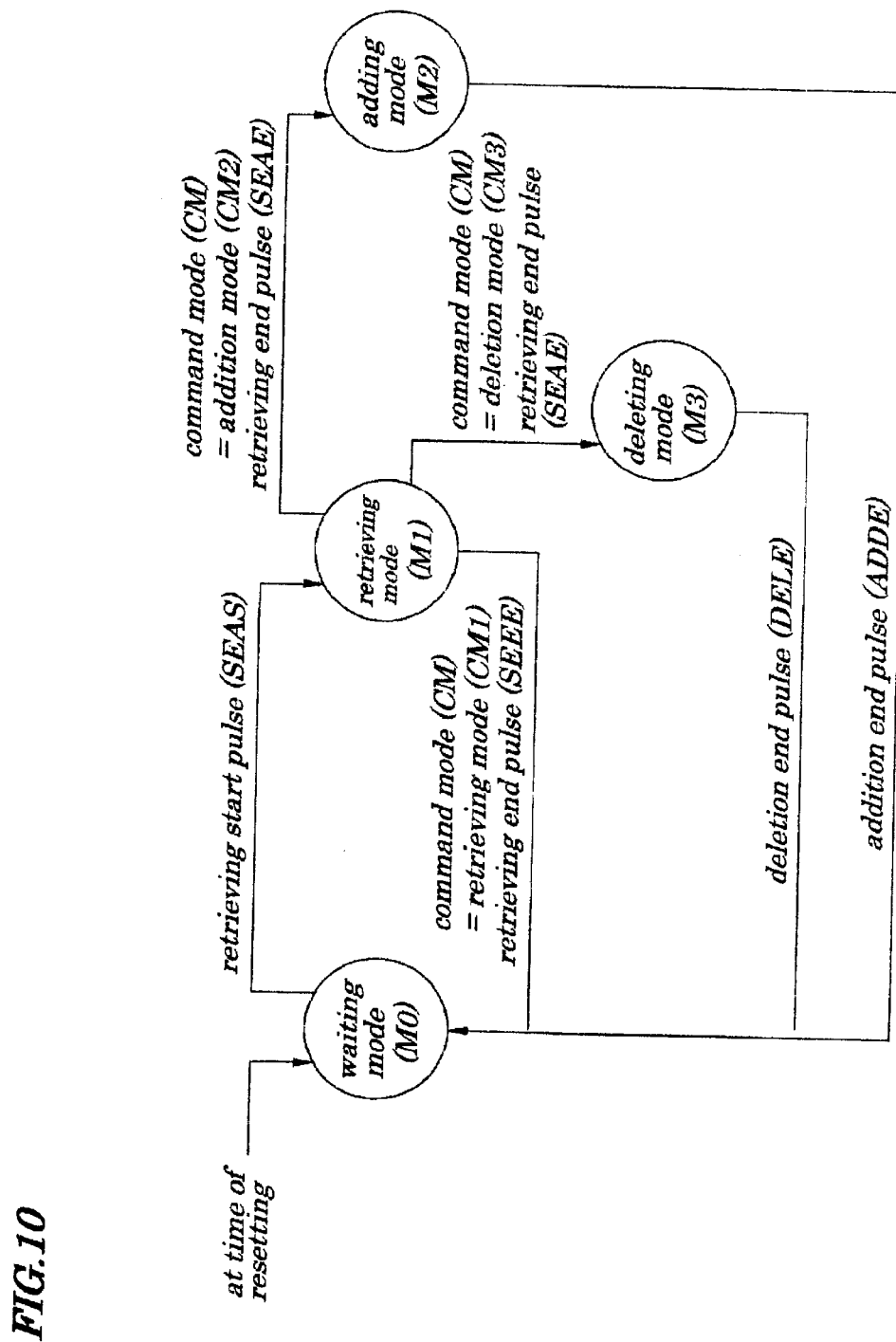
FIG. 10 is a diagram explaining a state transition in operation modes in an operation deciding circuit according to the first embodiment of the present invention.

As shown in FIG. 10, the operation mode (M) includes the waiting mode (M0), a retrieving mode (M1), an adding mode (M2) and a deleting mode (M3). FIG. 10 is a diagram explaining a state transition in operation modes (M) in the operation mode deciding circuit 22 according to the first embodiment. As shown in FIG. 10, the operation mode (M) is the waiting mode (M0) at a time of resetting. When the operation mode (M) is the waiting mode (M0), if the retrieving start pulse (SEAS) is inputted to the operation mode deciding circuit 22, the operation mode (M) is changed to the retrieving mode (M1). Moreover, while the operation mode (M) is a retrieving mode (M1) and the command mode (CM) is the retrieval mode (CM1), if the operation mode deciding circuit 22 receives the retrieving end pulse (SEAE), the operation mode (M) is changed to the waiting mode (M0). Also, while the operation mode (M) is the retrieving mode (M1) and the command mode (CM) is an addition mode (CM2), if the operation mode deciding circuit 22 receives the retrieving end pulse (SEAE), the operation mode (M) is changed to the adding mode (M2). Furthermore, while the operation mode (M) is the retrieving node (M1) and the command mode (CM) is a deletion mode (CM3), if the operation mode deciding circuit 22 receives the retrieving end pulse (SEAE), the operation mode (M) is changed to the deleting mode (M3). Also, while the operation mode (M) is the adding mode (M2), if the operation mode deciding circuit 22 receives the addition end pulse (ADDE), the operation mode (M) is changed to the waiting mode (M0). Furthermore, while the operation mode (M) is the deleting mode (M3), if the operation mode deciding circuit 22 receives the deletion end pulse (DELE), the operation mode (M) is changed to the waiting mode (M0).

Next, operations of the entry retrieving circuit 23 will be described below. Detailed explanation of internal configurations of the entry retrieving circuit 23 will be given later.

The entry retrieving circuit 23, when the operation mode (M) is changed from the waiting mode (M0) to the retrieving mode (M1), starts retrieving a path node conforming to the target address (TAD) and target mask length (TMSK). Then, the entry retrieving circuit 23 outputs an address of a node memory required for retrieving to the node memory accessing circuit 27. The entry retrieving circuit 23 receives a node entry read by the node memory access circuit 27 from the path tree storing memory 3, from the node memory accessing circuit 27. The entry retrieving circuit 23 outputs retrieved result to the result outputting circuit 28 and the operation mode deciding circuit 22.

Figure 4:
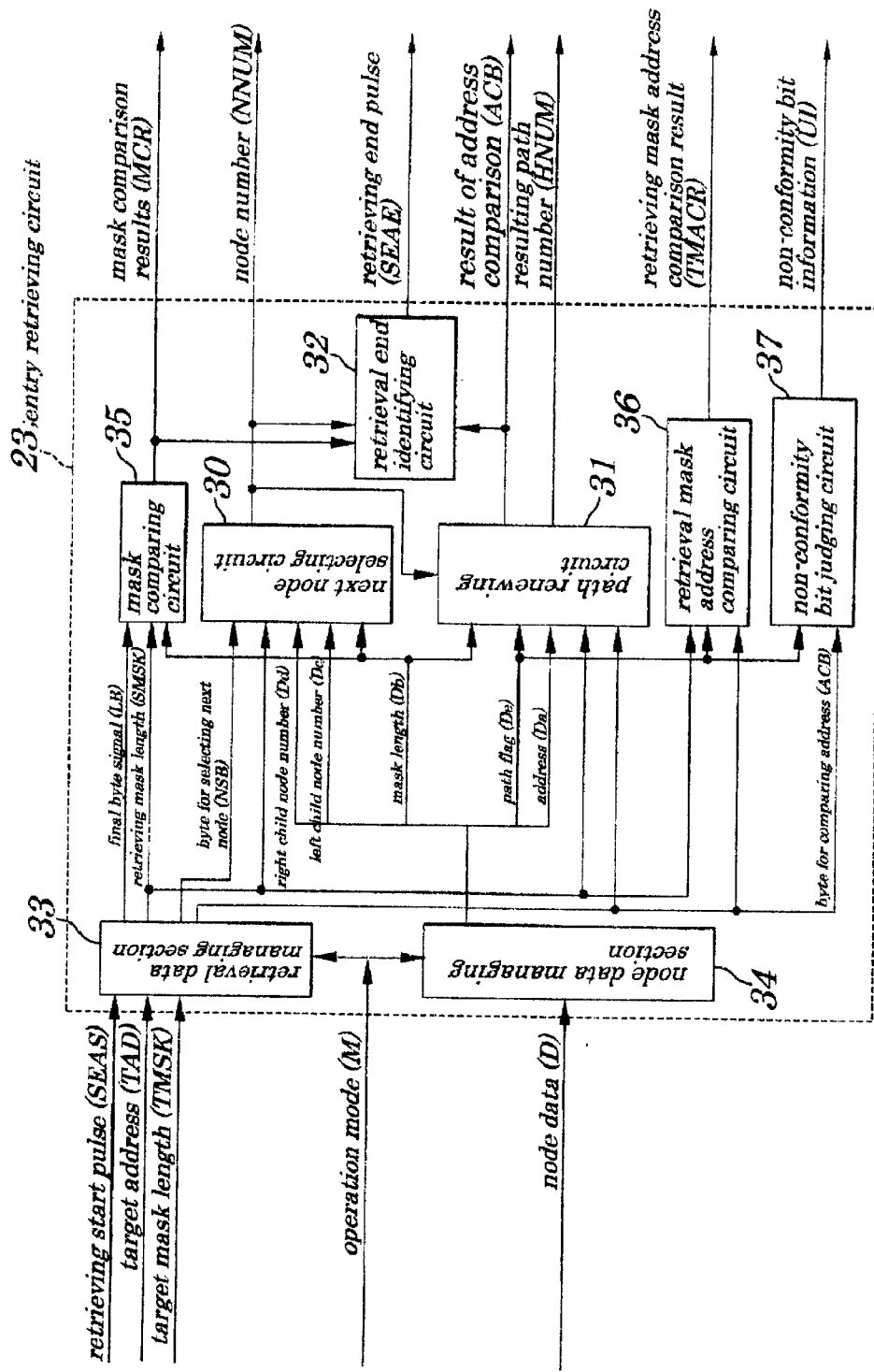
FIG. 4 is a schematic block diagram showing configurations of an entry retrieving circuit constituting the path retrieving circuit according to the first embodiment of the present invention.

As shown in FIG. 4, in a path renewing circuit 31 of the entry retrieving circuit 23, when the IPv4 address is retrieved, a comparison is made among 8 bits of the address comparison byte (ACB), 8 bits of the address (Da) held by a node and 3 bits of the split mask length (Db). In the conventional technology, comparison between the retrieving IP address and the network address held by the node is made for a width of 32 bits. In a next node selecting circuit 30 of the entry retrieving circuit 23, one bit is simply selected from 8 bits of the next node selection byte (NSB). In the conventional technology, one bit has to be selected from 32 bits of the retrieving IP address to perform processing of branching to the next node. Again, referring to FIG. 3, the node data holding circuit 24 holds node data read from the node memory accessing circuit 27.

Next, operations of the entry adding circuit 25 will be described below. The entry adding circuit 25, when the operation mode (M) becomes the adding mode (M2), decides a position at which a new entry is added, based on a node entry held by the node data holding circuit 24, target address (TAD) and target task length (TMSK). The entry adding circuit 25 outputs a node address (NA) of node memory and node data (ND) of node memory to the node memory accessing circuit 27, in order to update the path tree.

The entry adding circuit 25, after completion of addition of new entry, outputs an address of added node to the result outputting circuit 28 and, at a same time, outputs the addition end pulse (ADDE) showing completion of the addition of the entry to the operation mode deciding circuit 22. Moreover, the entry adding circuit 25, when having used an empty memory to add the new entry, outputs the use of the empty memory to an empty memory managing circuit 29. Detailed explanation of internal configurations and operations of the entry adding circuit 25 will be given later.

Operations of the entry deleting circuit 26 will be described below. The entry deleting circuit 26, when the operation mode (M) becomes the deleting mode (M3), decides the position where the entry is deleted, based on the target address (TAD), target mask length (TMSK), node entry held by the node data holding circuit 24. Then, the entry deleting circuit 26 outputs the node address (NA) of the node memory and node data (ND) of the node memory to the node memory accessing circuit 27 to update the path tree.

The entry deleting circuit 26, after completion of deletion of the entry, outputs the address of the deleted entry to the result outputting circuit 28 and simultaneously outputs deletion end pulse (DELE) to the operation mode deciding circuit 22. Moreover, the entry deleting circuit 26 outputs the useless path entry and transit entry to the empty memory managing circuit 29 to delete the new entry. Detailed explanation of internal configurations and operations of the entry deleting circuit 26 will be given later.

The operations of the node memory accessing circuit 27 will be described below. The node memory accessing circuit 27, when the operation mode (M) is the retrieving mode (M1), outputs an address (NDA) inputted from the entry retrieving circuit 23 to a node memory. The node memory accessing circuit 27 also reads node data corresponding to the address (NDA) from the node memory and outputs it to the entry retrieving circuit 23 and the node data holding circuit 24. The node memory accessing circuit 27, when the operation mode (M) is the deleting mode (M3), writes the address (NA) inputted from the entry adding circuit 25 and node data (ND) into the node memory. The node memory accessing circuit 27, when the operation mode (M) is the deleting mode (M3), writes the address (NDA) inputted from the entry deleting circuit 26 and the node data (NDD) into the node memory.

The operations of the result outputting circuit 28 will be described below. The result outputting circuit 28, when the command mode (CM) is the retrieval mode (CM1), receives the retrieving end pulse (SEAE) and a resulting node number (HNUM) from the entry retrieving circuit 23 and outputs them as a result of execution. Also, the result outputting circuit 28, when the command mode (CM) is the addition mode (CM2), receives the addition end pulse (ADDE), results of addition (success/failure) and additional path node number (ANUM) of added entry from the entry adding circuit 25 and outputs them as the result of execution. Moreover, the result outputting circuit 28, when the command mode (CM) is the deletion mode (CM3), receives the deletion end pulse (DELE), results of deletion (success/failure) and a deletion path node number (DNUM) of deleted entry from the entry deleting circuit 26 and outputs them as the result of execution.

The operations of the empty memory managing circuit 29 will be described below. The empty memory managing circuit 29, by creating a link list of unused node numbers on an empty list management memory 290, performs a management of node numbers in node memory storing memory. Moreover, the empty memory managing circuit 29 notifies empty node number (ENUM) to the entry adding circuit 25. The empty memory managing circuit 29, when an empty node using signal is inputted from the entry adding circuit 25, recognizes that outputted empty node number (ENUM) has been used. The empty memory managing circuit 29 obtains a number of the unused node from a head of the link list and updates the empty node number (ENUM) to the unused node number. Also, the empty memory managing circuit 29, when the number of disengaged node is inputted from the entry deleting circuit 26, adds the node number of the disengaged node to an end of the link list. Moreover, according to the embodiment, the empty list is managed by using the empty list managing memory 290, however, it may be managed by using a node storing memory.

The internal configurations of the entry retrieving circuit 23 are described by referring to FIG. 4.

The entry retrieving circuit 23 is composed of a retrieval data managing section 33, a node data managing section 34, the next node selecting circuit 30, the path renewing circuit 31, a mask comparing circuit 35, a retrieval end identifying circuit 32, a retrieval mass address comparing circuit 36 and a non-conformity bit judging circuit 37.

Out of these components, the retrieval mask address comparing circuit 36 and the non-conformity bit judging circuit 37 are circuits to produce a signal required in the entry adding circuit 25 and are not operated at the time of processing of retrieving the entry.

The retrieval data managing section 33 sets off 32 bits of the address to be retrieved (target address or TAD) representing the place to which the received packet data is to be transferred, by every 8 bits, and produces four-stage split retrieval address (address comparison byte ACB). The retrieval data managing section 33 produces a bit string for selection (node selection byte NSB) composed of the bit string obtained by shifting the bit string of each split retrieving address towards a low order bit by one bit.

Figure 5:
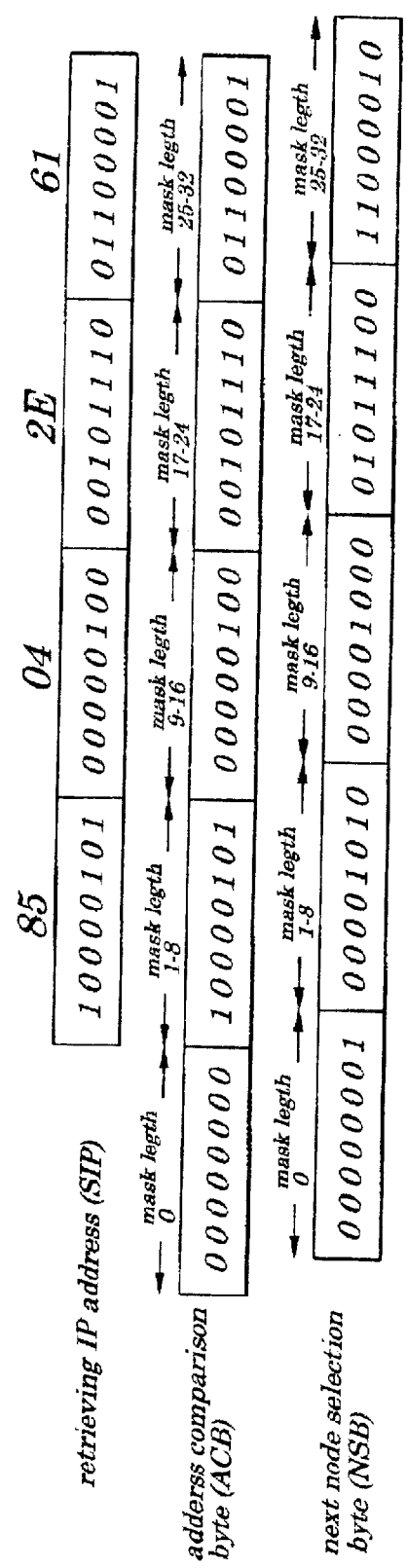
FIG. 5 is a diagram explaining bytes for comparing an address and for selecting a next node according to the first embodiment of the present invention.

FIG. 5 shows the address comparison byte (ACB) for comparing an address and the node selection byte (NSB) for selecting a next node in a case where [85042e61] is inputted as retrieving IP address (SIP0). The figures [85042e61] are those obtained by denoting IP address [133.4.46.97] in hexadecimal. Unless designated otherwise, all addresses are denoted in hexadecimal.

According to the embodiment, a bit string [00000000] with a mask length of being 0 is provided, as a top node, before the address comparison byte (ACB) for comparing the address of the bit string corresponding to the target address. Similarly, a bit string [00000001] with a mask length of being 0 is provided, as the top node, before the node selection byte (NSB) for selecting the next node. The retrieval data managing section 33, when receiving retrieving start pulse (SEAS), outputs the byte for comparing the address, the address comparison byte (ACB), the byte for selecting the next node, the node selection byte (NSB), a search mask length (SMSK) and a final byte signal (LB), based on the target address (TAD), target mask length (TMSK) and split mask length (Db) in node data (D).

The address comparison byte (ACB) and the next node selection byte (NSB) are updated when the node with the split mask length (Db) being 8 is received, with timing of reading the next node. The search mask length (SMSK) is updated by the following rules (0) to (3):

(0) At a time of inputting the target mask length (TMSK), the target mask length (TMSK) is substituted for a signal for calculating a search mask length (SMSK).

(1) When a read node is the top node, the search mask length (SMSK) is set to "8".

(2) When the read node is not the top node and a value of the signal for calculating the search mask length (SMSK) is larger than "8", the search mask length (SMSK) is set to "8" and the value of the signal for calculating the search mask length (SMSK) is decreased by 8.

(3) When the read node is not the top node and the value for calculating the search mask length (SMSK) is smaller than "8", the search mask length (SMSK) is used as the value for the search mask length (SMSK) calculating signal.

The search mask length (SMSK) is updated at a time of starting the retrieval and every time when the split mask length (Db) read from the node storing memory is "8".

The final byte signal (LB) is a signal indicating that the retrieving processing of the final byte has been completed and, if the search mask length (SMSK) calculating signal becomes smaller than "8", the signal reaches a level of showing the "final byte".

The node data managing section 34, when the operation mode (M) is the retrieving mode (M1), captures the node data (D) read from the node storing memory by using a flip flop. The node data (D) is composed of an address (Da), a split mask length (Db), a left child node number (Dc), a right child node number (Dd) and a path valid flag (De).

The node data managing section 34 outputs the mask length (Db) to the retrieval data managing section 33, the next node selecting circuit 30 and the path renewing circuit 31. Also, the node data managing section 34 outputs the left child node number (Dc) and the right child node number (Dd) to the next node selecting circuit 30. The node data managing section 34 outputs the address (Da) and the path valid flag (De) to the path renewing circuit 31.

Figure 6:
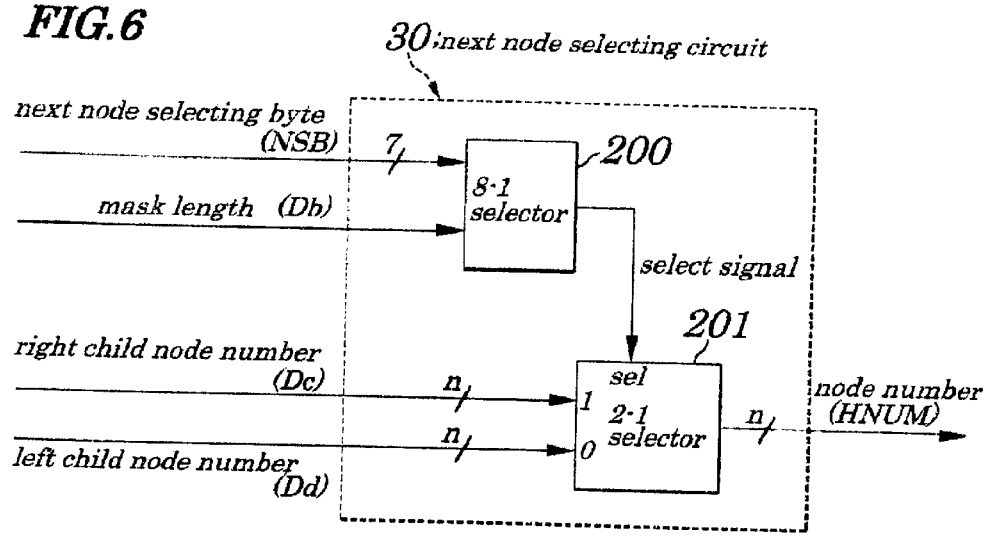
FIG. 6 is a diagram showing configurations of a next node selecting circuit constituting the entry retrieving circuit according to the first embodiment of the present invention.

FIG. 6 is a diagram showing configurations of the next node selecting circuit 30 of the entry retrieving circuit 23 according to the embodiment.

The next node selecting circuit 30 receives the byte for selecting the next node selection byte (NSB), the split mask length (Db), the left child node number (Dc) and right child node number (Dd) and outputs a node number (NUNM) of a node read from the node storing memory and the retrieving end purse (SEAE). The node selecting circuit 30 includes a 8-1 selector (200 and a 2-1 selector (201). The 8-1 selector (200) selects one bit from the byte for selecting the next node' node selection byte (NSB), using the split mask length (Db) as the selecting signal. If the mask length is "m", a high order m-th bits of the node selection byte is selected. The selected bit is inputted as a select signal of the 2-1 selector (201). When an inputted select signal is "0", the 2-1 selector (201) selects the left child node number (Dc) and outputs it as the node number (NNUM). When an inputted select signal is "1", the 2-1 selector (201) selects the right child node number (Dd) and outputs it as the node number (NNUM).

Figure 7:
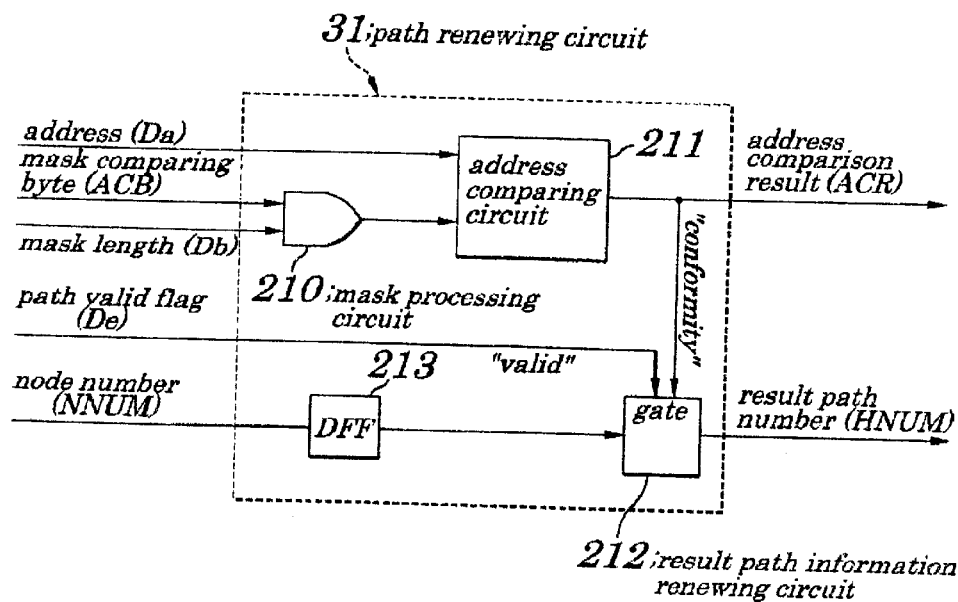
FIG. 7 is a diagram showing configurations of a path renewing circuit constituting the entry retrieving circuit according to the first embodiment of the present invention.

FIG. 7 is a diagram showing configurations of the path renewing circuit 31 of the entry retrieving circuit 23 according to the embodiment.

The path renewing circuit 31 is composed of a mask processing circuit 210, an address comparing circuit 211, a result path information renewing circuit 212 and a flip flop 213. The mask processing circuit 210 performs a mask processing on a portion corresponding to a valid bit of the address comparison byte (ACB) and outputs it, based on information about the split mask length (Db) out of the address comparison byte (ACB) and node data (D). That is, when the split mask length (Db) is "m" bits, the mask processing circuit 210 creates a mask address with its high order "m" bit being "1" and with its low order "8–m" bit being "0". Then, the mask processing circuit 210, by ANDing the mask address and the address comparison byte (ACB), outputs an address which is "0" in portions other than those corresponding to the valid bit.

The address comparing circuit 211 compares an address (Da) with an output from the mask processing circuit 210 and outputs address comparison result (ACR) showing a result from the comparison. The result path information renewing circuit 212, when the address comparison results (ACR) conform to each other and a path valid flag (De) is a value showing a sign of being valid, changes a result path number R being its output to a reading node number in synchronization with a clock signal. In contrast, if the address comparison result (ACR) does not conform to each other and if a path valid flag (De) is a value showing a sign of being not valid, the result path information renewing circuit 212 holds a value of result path information R. Moreover, the read node number is a signal obtained by storing the node number signal outputted by the next node selecting circuit 30 into the flip flop 213.

Into the mask comparing circuit 35 (FIG. 4) are inputted the split mask length (Db) of the node data (D), search mask length (SMSK) and the final byte signal (LB). The mask comparing circuit 35 checks whether a real mask of the read node exceeds the target mask (TMSK) by comparing the split mask length (Db) of the node data (D) with the search mask length (SMSK) and the mask comparison result (MCR). The mask comparing circuit 35 outputs the mask comparison result (MCR) to the retrieval end identifying circuit 32 and the entry adding circuit 25 (FIG. 3).

The mask comparison result (MCR) is one of three kinds of result signals including an "exceeded mask length (MCR-1)", a "same mask length (MCR-2)" and an "ordinary mask length (MCR-3)". The exceeded mask length (MCR-1) represents that the target mask length (TMSK) is larger than the real mask length of the present node. The same mask length (MCR-2) represents that the target mask length (TMSK) is the same as the real mask length of the present node. The ordinary mask length (MCR-3) represents that the target mask length (TMSK) is smaller than the real mask length of the present node. When the final byte signal (LB) is at a level of showing a "final byte", the mask comparing circuit 35 outputs the ordinary mask length (MCR-3) as mask comparison results (MCR). If the final byte signal (LB) is not at a level showing the "final byte" or when the search mask length (SMSK) is larger than the split mask length (Db) of the node data (D), the mask comparing circuit 35 outputs the exceeding mask length (MCR-1) as the mask comparison result (MCR). If the search mask length (SMSK) is the same as the split mask length (Db) of the node data (D), the mask comparing circuit 35 outputs the same mask length (MCR-2) as the mask comparison result (MCR). Also, if the search mask length (SMSK) is smaller than the split mask length (Db) of the node data (D), the mask comparing circuit 35 outputs the ordinary mask length (MCR-3) as the mask comparison result (MCR).

When the retrieving operation fits into one of the following end conditions, the retrieval end identifying circuit 32 judges he operation to have been terminated:

(1) First condition: The node number outputted from the next node selecting circuit 30 is an address that can meet the end conditions. The state in which the "address meets the end conditions" equals a state in which there is no address to be read next.

(2) Second condition: The address comparison result (ACR) is at a level indicating "non-conformity".

(3) Third condition: The exceeding mask length (MCR-1) or the same mask length (MCR-2) are outputted as the mask comparison result (MCR). If one of the above three conditions is met, the retrieving end pulse (SEAE) is asserted.

The retrieval mask address comparing circuit 36 is a circuit adapted so compare the address comparison byte (ACE) with the address (Da) in the node data (D), by using the search mask length (SMSK). The retrieval mask address comparing circuit 36, when the search mask length (SMSK) is "m", extracts high order "m" byte of the address (Da) and outputs the result of comparison between the address (Da) and the address comparison byte (ACB) as the address comparison result (ACR). When the search mask length (SMSK) is "m", the retrieval mask address comparing circuit 36 creates a mask address with its high order "m" bit being "1" and with its low order "8–m" bit being "0" and compares a result obtained by ANDing the mask address and the address (Da) with the address comparison byte (ACB). A retrieving mask address comparison result (TMACR) is either of a value indicating "conformity" or a value indicating "non-conformity".

The non-conformity bit judging circuit 37 compares the address (Da) with the address comparison byte (ACB) and outputs at which bit from a high order bit a different bit exists first, as the non-conformity information.

Next, an operation in the path retrieving using the path tree shown in FIG. 2 is described by taking a case in which the retrieving IP address (SIP0) [8504e61] is inputted as an example. If [85040011] is inputted as the retrieving IP address (SIP0), as explained below, in the process of the retrieving using the path tree (RT1), node 1, node 2, node 3, node 4 and node 5 are sequentially traced and finally a path of the node 5 is employed.

In retrieving, a "retrieving request" as the command (ICM), [85041201] as the address (IAD) and "32" as the address length are inputted from the input/output device 1 to the command receiving circuit 21.

The command receiving circuit 21 sets the command mode (CM) to the retrieval mode (CM1). Moreover, the command receiving circuit 21 outputs the retrieving address (also called the target address or "TAD") [850241201] and the mask length "32" (also called the target mask length or "TMSK") of th retrieving address and the retrieving start pulse (SEAS) to the entry retrieving circuit 23.

The operation mode deciding circuit 22, when receiving the retrieving start pulse (SEAS) from the command receiving circuit 21, changes the operation mode (M) from the waiting mode (M0) to the retrieving mode (M1).

The entry retrieving circuit 23, when the operation mode (M) is changed to the retrieving mode (M1), starts to retrieve a path node corresponding to the target address (TAD) [85041201] and to the target mask length (TMSK) "32".

Figure 11:
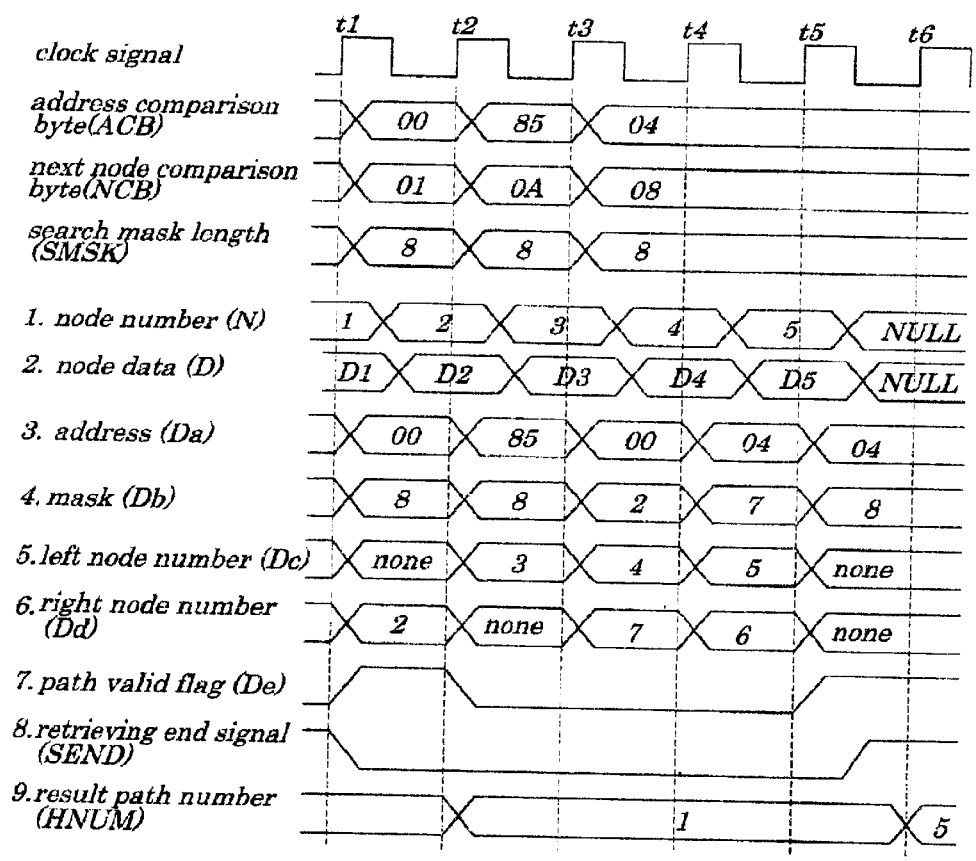
FIG. 11 is a timing chart explaining operations of the path retrieving circuit according to the first embodiment of the present invention.

FIG. 11 is a timing chart explaining operations of the path retrieving circuit 2 according to the first embodiment.

The path retrieving circuit 2 performs subsequent processing of the node which is read in synchronization with a clock signal in a cycle of one clock in a manner described below. As shown in FIG. 5, the retrieving IP address (SIP) is set off by every 8 bits (every one byte) at the retrieval data managing section 33. Then, the address comparison byte (ACB) and the next node selection byte (NSB) are produced.

Processing of the top node is described. At a time of starting the retrieval, the node memory accessing circuit 27 outputs a node address "1" of the top node. As a result, into the node data managing section 34 is inputted the node data (D1) of the top node and the address (Da), split mask length (Db), left child node number (Dc), right child node number (Dd) and path valid flag (De) are updated in synchronization with the time t1.

As the address comparison byte (ACB) of the top node, "00" is always set. Because of this, the address comparison byte (ACB) of the top node read first is "00". The next node selection byte (NSB) is "01". That is, "0" is set to the high order 7 bits of the next node selection byte (NSB) of the top node and the highest bit of the retrieving IP address (SIP0) is set to the low order 1 bit.

Therefore, the retrieving data managing section 33 outputs the address comparison byte (ACB) "00", next node comparison byte "01" and search mask length "8", based on the target address (TAD) [85041201] and the target mask (TMSK) "32".

In the next node selecting circuit 30, because the split mask length (Db) is "8", the low order bit "1" of the next node comparison byte (NCB) "01" is selected and the right child node number (Dd) "2" is outputted as the node number (NNUM).

In the example, since the split mask length (Db) of the top node is set to "8" for convenience's sake, which node, the left child node (Dc) or right child node (Dd), the branching should be made to, is decided, based the low order 1 bit of the next node selection byte (NSB) "01", that is, the highest order bit of the retrieving IP address. In the example, since the highest order bit is "1", the node number (Dd) "2" being the child node on the right side is outputted as the node number (NNUM). Therefore, the branching is made to the right child node (Dd) (hereinafter, a node having a node number being "n" is represented as "node n").

Moreover, in the path renewing circuit 31, a comparison among the address comparison byte (ACB) "00", the address (Da) "00" and the mask length (Db) "8" is made. The address (Da) of the top node is "00". Because of this, results of the address comparison at the top node conform. Furthermore, since the path valid flag (De) is valid, the result path number (HNUM) are updated so as to have the node number "1", in synchronization with a clock at time t2.

Processing of the node 2 is described below. A node number (NNUM) "2" is outputted as the node address (N) to the path tree storing memory 3 and the node data (D) "D2" is read. The node data managing section 34, when the node data (D) "D2" is read, updates the address (Da), mask length (Db), left child node number (Dc), right child node number (Dd) and path valid flag (De) in synchronization with the clock at time t2.

The retrieval data managing section 33, since the mask length (Db) existing immediately before time t2 is "8", changes the address comparison byte (ACB) to "85" and the next node comparison byte to "0A" and the search mask length to "8" in synchronization with the clock at time t2. At a same time when the processing of reading the node 2 is performed, the address comparison byte (ACB) is changed to "85" and the next node comparison byte (NCB) to "0A".

In the next node selection circuit 30, since the split mask length (Db) is "8", a reference is made to the low order bit (8-th bit) of the next node comparison byte "0A" . Because the value of the low order bit is "0", the node to be read next is the node 3. Therefore, the left child node number (Dc) "3" is outputted as the node number (NNUM).

In the path renewing circuit 31, a comparison among the address comparison byte (ACB) "85", split address (Da) "85" of the node 2 and split mask length (Db) "8" is made. In this case, results of the comparison conform to each other. However, since the path valid flag (De) is not valid, the result path information number (HNUM) is not updated in synchronization with the clock at time t3 and the node number "1" is held.

Processing of the node 3 is described below. The node number (NNUM) "3" is outputted as the node address (N) to the path tree storing memory 3 and the node data (D) "D3" is read. The node data managing selection 34, when the node data (D) "D3" is read, updates the address (Da), split mask length (Db), left child node number (Dc), right child node number (Dd) and path valid flag (De).

The retrieval data managing section 33, since the split mask length (Db) existing immediately before time t3 is "8", changes the address comparison byte (ACB) to "04" and the next node comparison byte (NCB) to "08" and the search mask length (SMSK) to "8".

In the next node selection circuit 30, since the mask length (Db) is "2", the high order 2-th bit "0" of the next node comparison byte (NCB) is selected and the left child node number (Dc) "4" is outputted as the node number (NNUM).

In the path renewing circuit 31, a comparison among the address comparison byte (ACB) "04", address (Da) "00" and split mask length (Db) "2" is made. In this case, though results of the comparison conform to each other, since the path valid flag (De) is not valid, the result path information number (HNUM) is not renewed in synchronization with the clock of time t3 and the node number "1" is held.

Processing of the node 4 is described below. The node number (NNUM) "4" is outputted as the node address (N) to the path tree storing memory 3 and the node data (D) "D4" is read. The node data managing section 34, when the node data (D) "D4" is read, updates the address (Da), split mask length (Db), left child node number (Dc), right child node number (Dd) and path valid flag (De).

The retrieval data managing section 33, since the mask length (Db) existing immediately before time t4 is "2", in synchronization with the clock at time t4, holds the address comparison byte (ACB) "04", next node comparison byte (NCB) and search mask length (SMSK) "8".

In the next node selecting circuit 30, since the split mask length (Db) is "7", the high order 7-th bit "0" of the next node comparison byte (NCB) "08" is selected and the left child node number (Dc) "5" is outputted as the node number (NNUM).

In the path renewing circuit 31, a comparison among the address comparison byte (ACB) "04", address (Da) "04" and split mask length (Db) "7" is made. In this case, though results of the comparison conform to each other, since the path valid flag (De) is not valid, the result path information number (HMUM) is not renewed in synchronization with the clock at time t3 and the node number "1" is held.

Processing of the node 5 is described below. The node number (NNUM) "5" is outputted as the node address (N) to the path tree storing memory 3 and the node data (D) "D5" is read. The node data managing section 34, when the node data (D) "D5" is read, updates the address (Da), split mask length (Db), left child node number (Dc), right child node number (Dd) and path valid flag (De) in synchronization with the clock at time t5.

The retrieval data managing section 33, since the split mask length (Db) existing immediately before the time t5 is "7", holds the address comparison byte (ACB) "04", next node comparison byte (NCB) "08" and search mask length (SMSK) "8".

In the next node selecting circuit 30, since the split mask length (Db) is "8", the low order bit "0" of the next node comparison byte (NCB) "08" is selected and the left child node number (Dc) "None" is outputted as the node number (NNUM).

In the path renewing circuit 31, a comparison between the address comparison byte (ACB) "04", address (Da) and split mask length (Db) "8" is made. In this case, results of the comparison conform to each other. Moreover, since the node 5 is a path node, the path valid flag (De) is "valid". Because of this, the result path number (HNUM) is updated so as to have the node number "5" in synchronization with the clock at time t6.

Since the node 5 has no child node and there is no node to be read in the next node selecting processing, the retrieving is made complete at the node 5. That is, the retrieval end identifying circuit 32, since the node number (NNUM) outputted from the next node selecting circuit 30 is "none", judges that the retrieving has been terminated and outputs the retrieval end pulse (SEAE) "H".

Moreover, result outputting circuit 28, since the retrieving end pulse (SEAE) becomes "H", knows that the retrieving is made complete and outputs the result path number (HNUM) "5" to the input/output device 1. The node number of the node corresponding to the retrieving IP address (SIP0) is the node number 5.

As described above, according to the embodiment, in the entry retrieving circuit 23, the retrieving address is split into units of bytes and the retrieving processing is performed for every split address. This allows she entry retrieving circuit 23 to perform the next node retrieving processing and address solving processing at a very high speed. This also allows scales of circuits including the next node selecting circuit 30 and the address solving processing circuit contained in the entry retrieving circuit 23 to be greatly reduced. Since the bit width of the address to be retrieved becomes limitless, the address with various length can be retrieved.

In the path table stored in the node storing memory, since the width of the address is limited to 8 bits as the node data and the width of the mask length is limited to 3 bits, required memory capacity can be reduced greatly. In the conventional technology, when a host path of the IPv6 address is retrieved, it is necessary to save the address with the width being 128 bits and with the mask length being 7 bits.

Expansion of the retrieving processing to perform addition and deletion of the path is described below.

In the path retrieving circuit 2 according to the present invention, additional processing including the retrieving algorithm can be performed in order to carry out the path addition processing and path deletion processing. In the additional processing of the path entry, a position where a network address defined by the IP address to be added and the mask is added, is retrieved in accordance with the retrieving algorithm. Based on retrieved results, the addition of the node and updating of links among nodes are carried out. In the deletion processing of the path entry, the network address defined by the IP address to be deleted and the mask is retrieved in accordance with the retrieving algorithm. Based on retrieved results, the deletion of the node and updating of links among nodes are carried out.

Next, the addition of the mask information is described below. The path entry is defined by two kinds of pieces of information including the IP address and mask length. Because of this, to retrieve the position for addition of the path and to retrieve deletion entry, the retrieving of the information including the mask is required. If the split mask length (Db) of the node to be read is smaller than the target mask length, since further retrieving is not required, the retrieving is terminated. At a time of terminating the retrieval, information about which is larger, the split mask length (Db) of the node data or target mask length (TMSK), is required for performing the algorithm.

The addition of the address comparison processing is described below. In the address comparison processing of the retrieving algorithm described above, the address comparison is made by using the split mask length (Db) of the node data. Additionally, the address comparison using the target mask length (TMSK) is added (hereinafter, the address comparison processing may be also referred to as "target mask address comparison processing").

That is, when the target mask length (TMSK) is "m", the high order "m" bits of the address comparison byte (ACB) are taken out and whether these values conform to values of high order "m" bits of the address (Da) is checked. The result of the comparison of the target mask address is used to decide a pattern to be added at a time of the addition of the path. The algorithm of the node addition mode is described in detail later.

Storing of the node information is described below. To perform the addition and deletion processing, it is necessary to store the node information at a time of terminating the retrieval.

Figure 8:
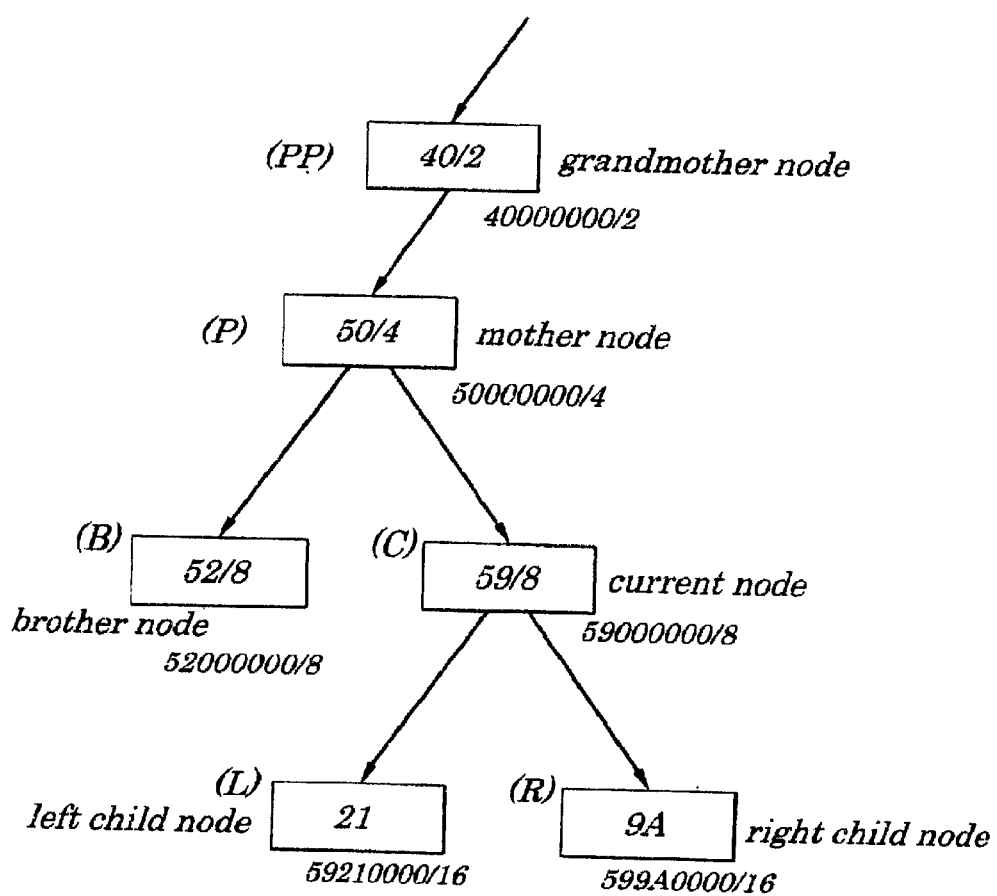
FIG. 8 is a diagram showing a correlation between nodes according to the first embodiment of the present invention.

FIG. 8 is a diagram showing a correlation between nodes according to the embodiment. By using FIG. 8, names of nodes surrounding the node being currently read are defined and information required to be held to perform the addition and deletion processing is designated.

First, names of the node are defined as below:

Current node (CNOD): Node that had been read at a time of the termination of the retrieval.

Left child node (LNOD): Node being branched to a left side from the current node.

Right child node (RNOD): Node being branched to a right side from the current node.

Child node (CHNOD): Right child node or left child node.

Mother node (MNOD): Node called previously by one from the current node. If the mother node is used as a standard, the current node is the child node.

Grandmother node (GMNOD): Node called previously by one from the mother node. If the grandmother node is used as a standard, the mother node is the child node.

Brother node (BNOD): When the mother node has two child nodes, this is the child node not being the current node.

However, if no child node of the current node exists at a time of the execution of the deletion processing, as described below, a second definition of the mother node, which is different from the above definition, is applied.

Figure 20:
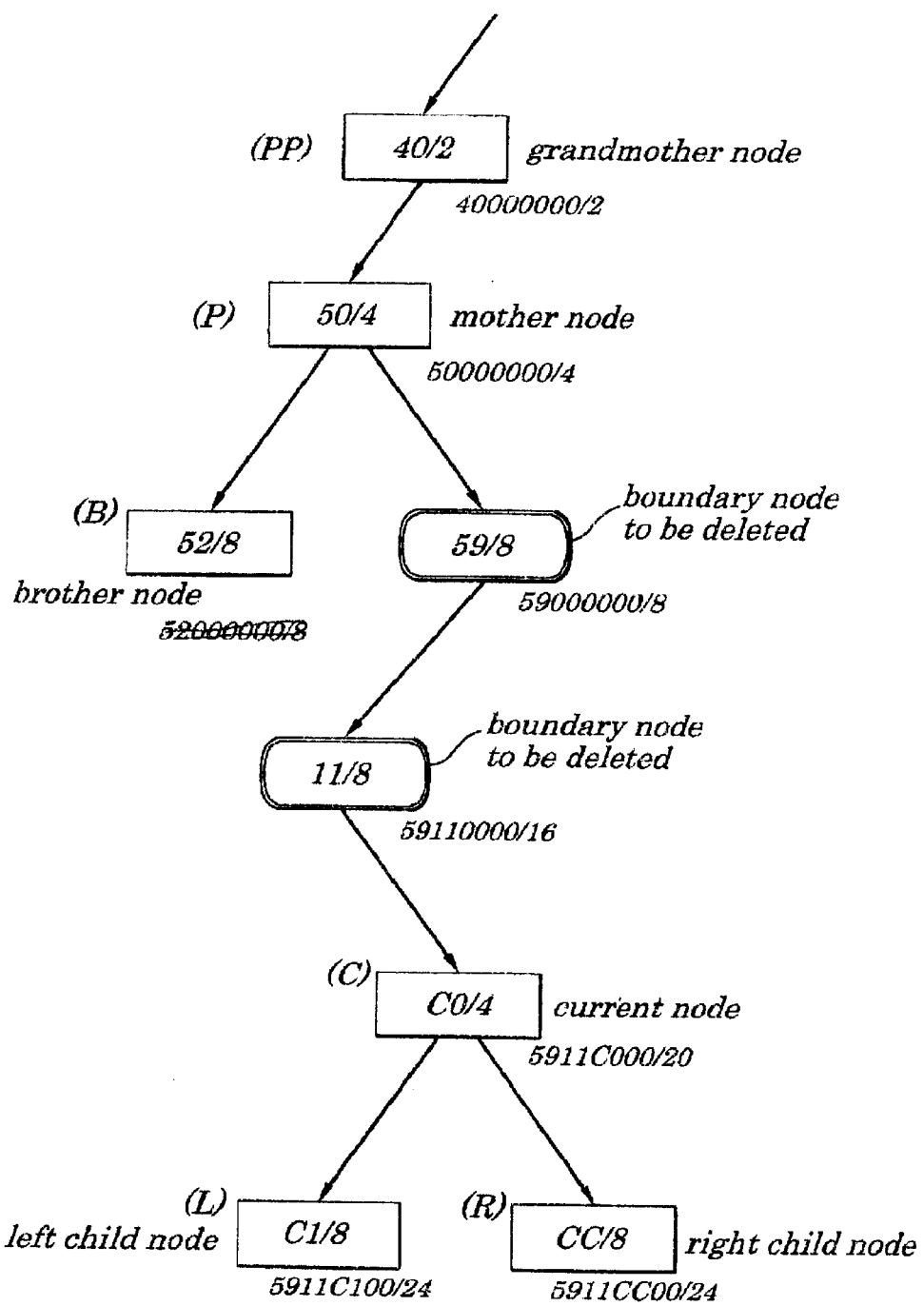
FIG. 20 is a diagram showing a path tree used to explain a method for deleting an entry according to the first embodiment of the present invention.
Figure 21:
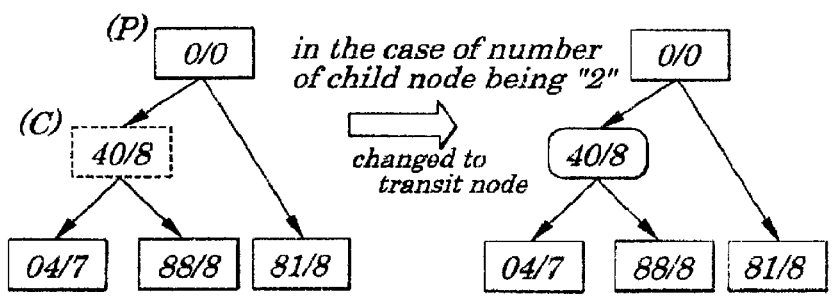
FIG. 21 is a diagram showing a part of the path tree to explain one example of a deletion pattern 1 according to the first embodiment of the present invention.

In FIG. 20, a correlation is shown between nodes in the case where no child node exists at a time of the execution or the deleting processing. If no child node exists at the time of executing the deleting processing, the mother node does not become a boundary node. The path tree is traced upward from the current node and a first node being not the boundary node is defined as a mother node. The boundary node interposed between the mother node and the current node is defined to be the boundary node to be deleted (second definition).

To execute the addition and deletion processing of the path, the following information is stored in advance:

After only node number is stored, the node number may be read, when necessary, from a node storing memory. However, in the path retrieving circuit 2 according to the present embodiment, in order to perform the addition and deletion processing at the high speed, the following information including (1) to (7) is stored in advance.

(1) All node data of the current node.
(2) Node number of the left child node.
(3) Node number of the right child node.
(4) All node data of the mother node and branched bit of the mother node.
(5) All node data of the grandmother node and branched bit of the grandmother node.
(6) Node number of the brother node (which can be obtained from the left child node number of the mother node, right child node number and mother node branched bit).
(7) Node number of the boundary node to be deleted (however, two or more node numbers can exist).

The mother node branching bit is a bit representing to which node, right or left, the mother node has branched and, if it is "0", it shows that the mother node has branched to the left and, if it is "1", it shows that the mother node has branched to the right. The grandmother node branching bit is a bit representing to which node, right or left, the grandmother node has branched and, if it is "0", the grandmother node has branched to the left and, if it is "1", the mother node has branched to the right.

The node data holding circuit 24 (FIG. 9), when operation mode (M) is retrieving node (M1), holds node data (D) read from the path tree storing memory 3. The data held by the node data holding circuit 24 includes grandmother node data (GMNOD), mother node data (MNOD), deletion boundary node number (DBNUM) and a number of deletion boundary node number (DBC).

The grandmother node data (GMNOD) includes the node data (D) obtained from reading the grandmother node data (GMNOD) and branched bit (BB) outputted from the entry retrieving circuit 23 at a time of processing the grandmother node data (GMNOD). Hereinafter, the branched bit of the grandmother node data (GMNOD) is called a "grandmother node data branched bit (GMBB)".

The mother node data (MNOD) includes the node data (D) obtained when the mother node data (MNOD) is read and the branched bit (BB) outputted from the entry retrieving circuit 23 when the mother node data (MNOD) is processed. The branched bit of the mother node data (MNOD) is called a "mother node data branched bit (MBB)".

Figure 9:
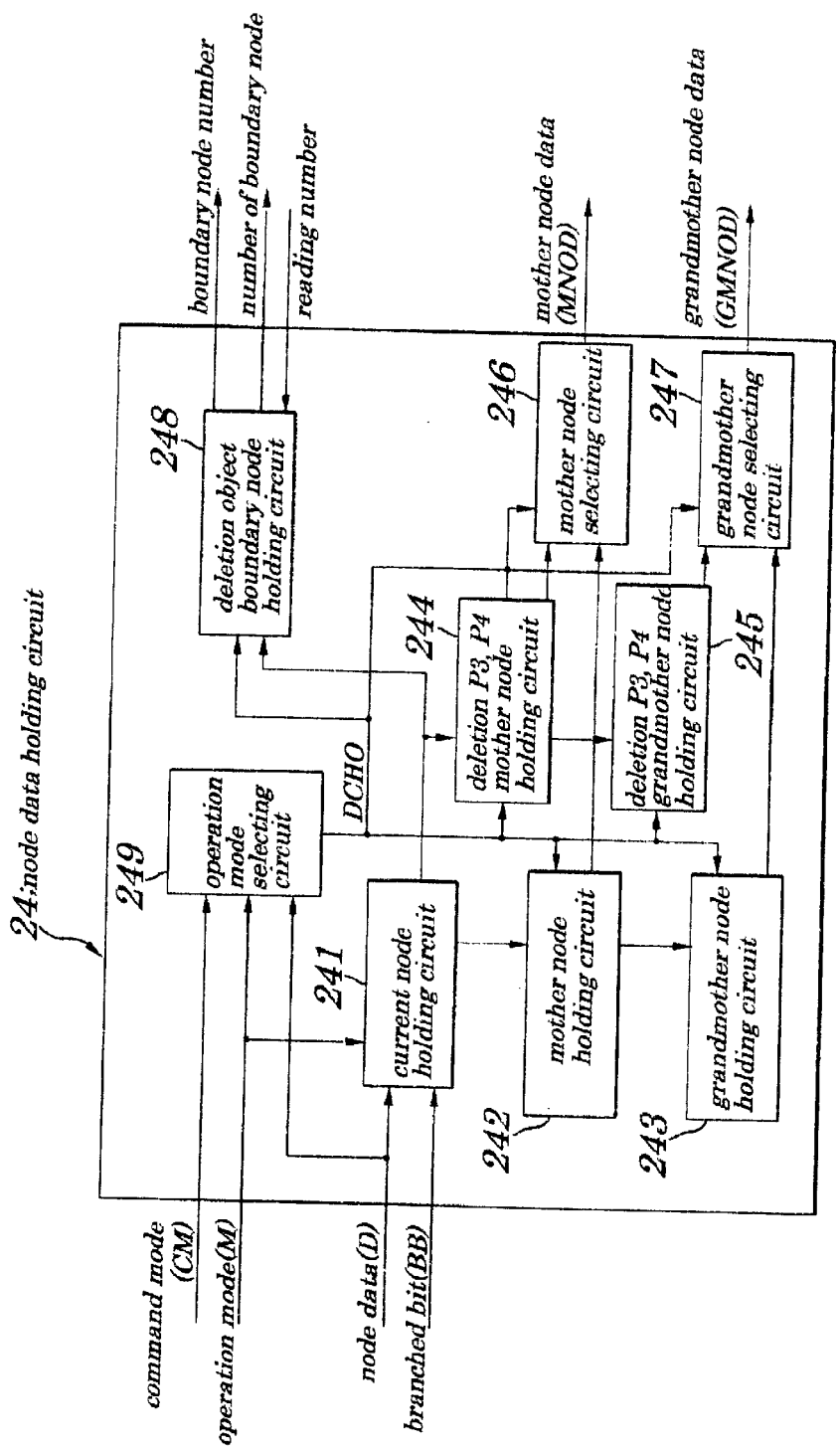
FIG. 9 is a schematic block diagram showing configurations of a node data holding circuit constituting the path retrieving circuit according to the first embodiment of the present invention.

Next, configurations of the node data holding circuit 24 will be described by referring to FIG. 9.

The node data holding circuit 24 is composed of a current node holding circuit 241, a mother node holding circuit 242, a grandmother node holding circuit 243, a deletion P3, P4 mother node holding circuit 244, a deletion P3, P4 grandmother node holding circuit 245, a mother node selecting circuit 246, a grandmother node selecting circuit 247, an operation node selecting circuit 249 and a deletion object boundary node holding circuit 248.

The current node holding circuit 241 outputs current node data (CNOD) to the mother node holding circuit 242, the deletion P3, P4 mother node holding circuit 244, the deletion object boundary node holding circuit 248.

The current node holding circuit 241, when the operation mode (M) is the retrieving mode (M1), changes the current node data (CNOD) outputted from the node storing memory to the node data (D) and that outputted from the entry retrieving circuit 23 to the branched bit (BB). If the operation mode (M) is a mode other than the retrieving mode (M1), the current node holding circuit 241 holds values of the current node data (CNOD).

The operation mode selecting circuit 249, when the operation mode (M) is the retrieving mode (M1), outputs a deletion mode child node 0 signal (DCH0), based on a left child node number (Dc) and a right child node number (Dd) in the node data (D) and command mode (CM). The number of child nodes of the current node is decided depending on whether the left child node number (Dc) and right child node number (Dd) are valid addresses or not.

When the command mode (CM) is the deletion mode (CM3) and when the number of the child node of the current node is "0", the deletion mode child node 0 signal (DCH0) is outputted in a high (H) level state. When the command mode (CM) is a mode other than deletion mode (CM3) or when the number of the child node of the current node is "1" or "2", the deletion mode child node 0 signal (DCH0) is outputted in a low (L) level state.

The mother node holding circuit 242, when the deletion mode child node 0 signal (DCH0) is at the "L" level, renews an output from the current node holding circuit 241 in synchronization with a clock and outlet it to the grandmother node holding circuit 243 and the mother node selecting circuit 246.

Moreover, the grandmother node holding circuit 243, when the deletion mode child node 0 signal (DCH0) is at the "L" level, renews an output from the mother node holding circuit 242 in synchronization with a clock and outputs it to the grandmother node selecting circuit 247.

The deletion P3, P4 mother node holding circuit 244, the deletion mode child node 0 signal (DCH0) is at the "H" level, renews an output from the current node holding circuit 241 in synchronization with a clock and outputs it to the deletion P3, P4 grandmother node holding circuit 245 and the mother node selecting circuit 246.

The deletion P3, P4 grandmother node holding circuit 245, when the deletion mode child node 0 signal (DCH0) is at the "H" level, renews an output from the deletion P3, P4 grand mother node holding circuit 245 in synchronization with a clock and outputs it to the grandmother selecting circuit 247.

The mother node selecting circuit 246, when the deletion mode child node 0 signal (DCH0) is at the "H" level, outputs an output from the deletion P3, P4 mother node holding circuit 244 as a mother node data (MNOD).

The mother node selecting circuit 246, when the deletion mode child node 0 signal (DCH0) is at the "L" level, outputs an output from the mother node holding circuit 242 as a mother node data (MNOD).

The grandmother node selecting circuit 247, when the deletion mode child node 0 signal (DCH0) is at the "H" level, outputs an output from the deletion P3, P4 grandmother node holding circuit 245 as a grandmother node data (GMNOD).

When the deletion mode child node 0 signal (DCH0) is at the "L" level, the grandmother node selecting circuit 247 outputs an output from the grandmother node holding circuit 243 as the grandmother node data (GMNOD).

The deletion object boundary node holding circuit 248, when the current node outputted from the current node is a boundary node and the node read previously by one is a node other than the boundary node, clears the boundary node number stored in memory in the deletion object boundary node holding circuit 248. Then, the node number of the current node is newly stored in the deletion object boundary node holding circuit 246 and the number of the boundary node is set to "1". If the node read previously by one is the boundary node, the deletion object boundary node holding circuit 248 stores the node number of the current node in the memory of the deletion object boundary node holding circuit 248 as additional information and increments the number of the boundary nodes by one.

When the current node outputted from the current node is a transit node or when the node 0 signal for P3 and P4 is at the "L" level, the deletion object boundary node holding circuit 248 clears the boundary node number stored in the memory in the deletion object boundary node holding circuit 248 and sets the number of the boundary nodes to "0".

When a number read from the entry deleting circuit 26 is inputted and when a node number corresponding to the read number is stored in the memory, the deletion object boundary node holding circuit 248 outputs the read node number as the boundary node number to the entry deleting circuit 26.

Figure 12:
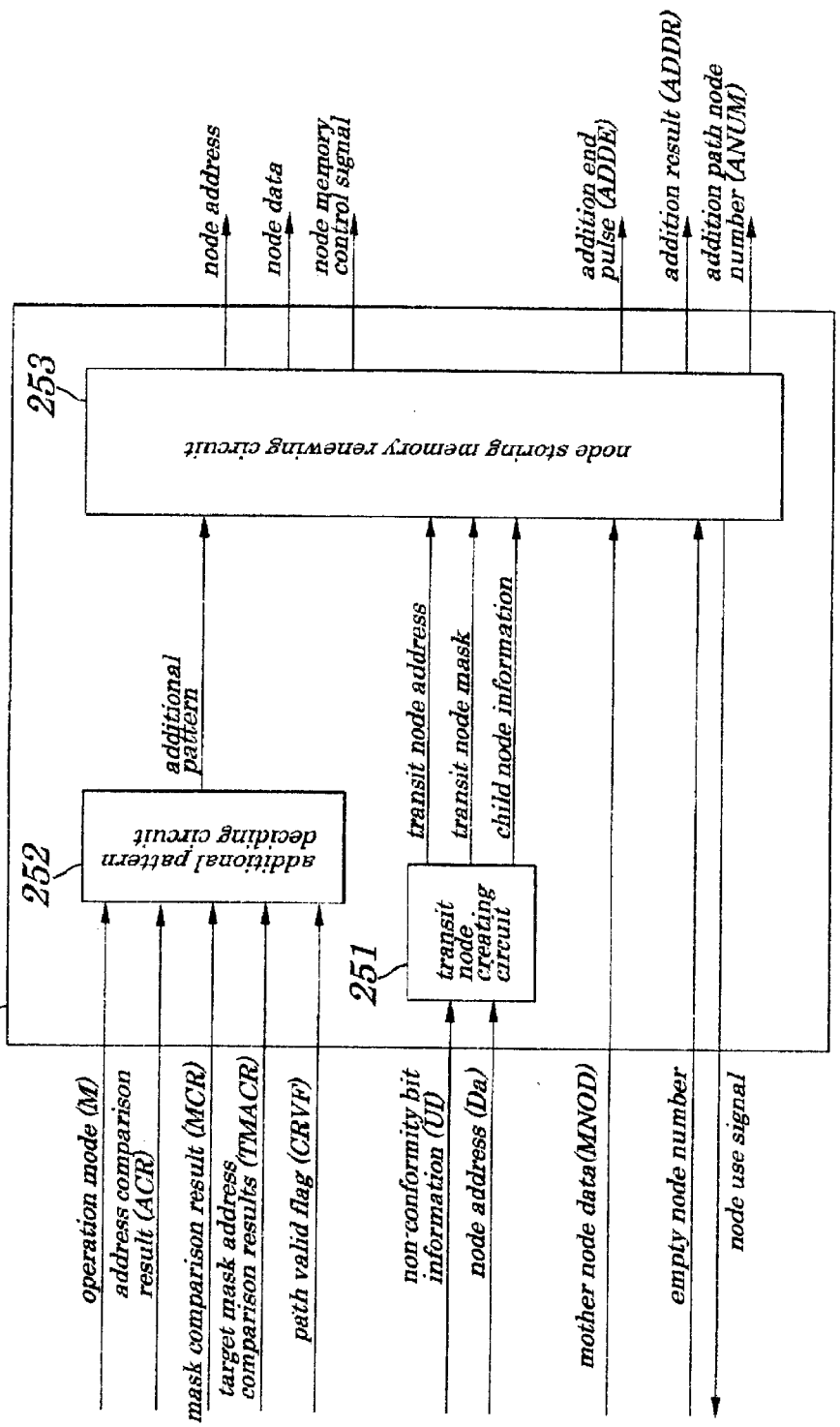
FIG. 12 is schematic block diagram showing configurations of an entry adding circuit constituting the path retrieving circuit according to the first embodiment of the present invention.
Figure 13:
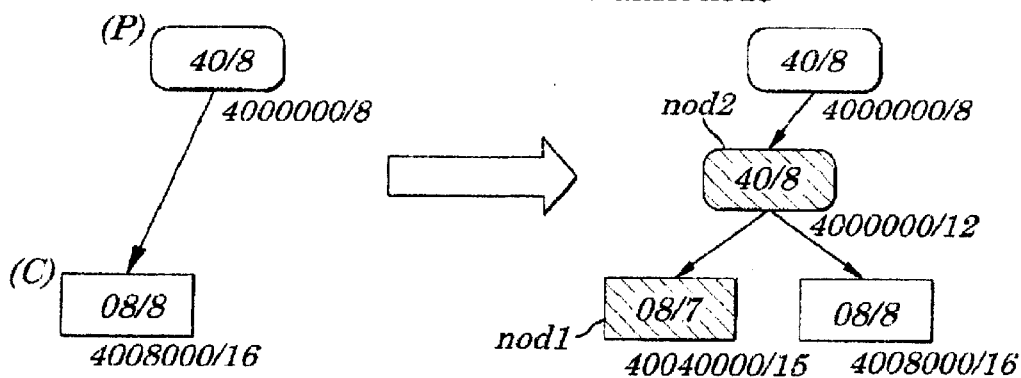
FIG. 13 is a diagram of a part of the path tree to explain one example of an additional pattern 1 according to the first embodiment of the present invention.

Configurations of the entry adding circuit 25 are described below by referring to FIG. 12. FIG. 12 is a schematic block diagram showing configurations of the entry adding circuit 25 constituting the path retrieving circuit 2 according to the first embodiment. As shown in FIG. 12, the entry adding circuit 25 includes an additional pattern deciding circuit 252, a transit node creating circuit 251 and a node storing memory renewing circuit 253.

The entry adding circuit 25 sets a new entry at a position where an entry is to be added, which is decided by retrieving processing by the entry retrieving circuit 23 (see FIG. 3).

The additional pattern deciding circuit 252, when the operation mode (M) is changed to the adding mode (M2), decides the additional pattern, based on address comparison results (ACR), mask comparison results (MCR), target mask address comparison results (TMACR), a path valid flag (CRVF) of the current node. The additional pattern includes the following five patterns:

(1) In the Case of Pattern 1 (Non-conformity of Address):
The mask comparison results (MCR) shows the ordinary mask length or the same mask length and the address comparison results (ACR) do not conform to each other. The mask comparison results (MCR) shows the exceeding mask length and the target mask address comparison results (TMACR) do not conform to each other.

(2) In a Case of Pattern 2 (No Next Node):
The mask comparison results (MCR) shows the ordinary mask length and the address comparison results (ACR) do not conform to each other.

(3) In a Case of Pattern 3 (Exceeding Mask Length):
The mask comparison results (MCR) shows the exceeding mask length and the target mask address comparison results (TMACR) do not conform to each other.

(4) In a Case of Pattern 4 (Existence of Same Transit/boundary Nodes):
The mask comparison results (MCR) are a same, the address comparison results (ACR) do not conform to each other and the path valid flag (CRVF) is invalid.

(5) In the Case of Pattern 5 (Existence of Same Path), That is, of Failure in Addition:
The mask comparison results (MCR) are the same, the address comparison results (ACR) conform to each other and path valid flag (CRVF) is valid.

The transit node creating circuit 251 creates an address of the transit node, mask length of the transit node and information of the child node, by using a non-conformity bit information (UI) and the address (Da). When a non-conformity in the address occurs at high order m-th bit from the non-conformity bit information (UI), an address of the transit node is obtained by ANDing a mask address with high order "m to 1" bits being "1" and with low order "9 to m" bits being "1" and the address (Da). Therefore, the mask length of the transit node is "m−1".

The child node information is signal showing whether the node to be newly added is the right child node of the transit node or the left child node. The child node information, when the m-th bit of the address (Da) is "1", becomes the left child node, while, when the m-th bit of the address (Da) is "0", it becomes the right child node.

The node storing memory renewing circuit 253, by using the additional pattern used to select the additional pattern deciding circuit 252, performs the processing of renewing the node storing memory to update the path tree. Moreover, when the addition of the path node, transit node or boundary node is required, by using an empty node number inputted from the empty node management block, outputs a node usage signal. The node storing memory renewing circuit 253 outputs addition end pulse (ADDE), addition result signals (success/failure), addition path node number (ANUM) of the added entry to a result outputting circuit.

Next, a path addition algorithm for the addition of new entry in the path retrieving circuit 2 of the present invention is described below. The addition of the entry is carried out in two stages including (1) processing of retrieving a position to be added and (2) processing of adding an entry.

The method for adding the entry includes following four patterns depending on existence or absence of the non-conformity of the address and of the excess of the mask length. However, the case of the failure in the addition is excluded.

(1) Pattern 1: In a case of occurrence of non-conformity in the address.

The pattern 1 is the case where the non-conformity occurs in processing of the address comparison with the current node. In this case, the transit node is added below the mother node and both a path node and a current node to be newly added are set as a child node of the transit node.

The condition for the non-conformity in address includes either of the case where the result of the address comparison shows non-conformity when the mask length does not exceed or the case where the result of the target mask address comparison shows conformity when the mask length exceeds. If the right child node of the mother node is the current node, the transit node becomes the right child node of the mother node, while, if the left child node of the mother node is the current node, the transit node becomes the left child node of the mother node.

The mask length of the address of the transit node is determined by a change point of the current node and the newly created node. The transit node is obtained from the address and its length of a common portion from high order bit of the current node and the newly added node. Which node, the current node or the newly created node, becomes the right child node or the left child node is decided by the change point of the address of the current node and the newly created node.

Figure 14:
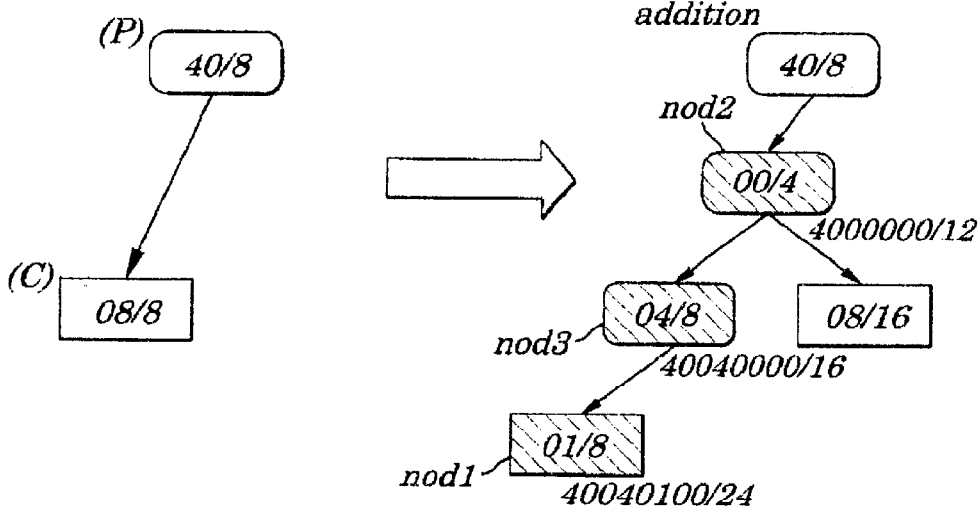
FIG. 14 is a diagram of a part of the path tree to explain an other example of the additional pattern 1 according to the first embodiment of the present invention.
Figure 15:
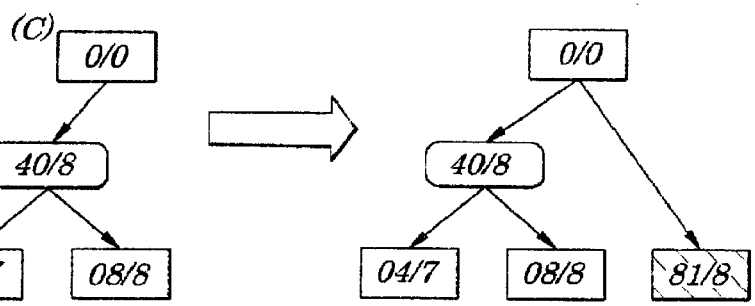
FIG. 15 is a diagram of a part of the path tree to explain one example of an additional pattern 2 according to the first embodiment of the present invention.

When a bit of the change point of the newly created node is "1", the newly created node becomes the right child node of the transit node and the current node becomes the left child node of the transit node. When the bit of the change point of the newly created node is "0", the newly created node is the transit node and the current node becomes the right child node of the transit node. If a boundary exists between the transit node and the newly created node, as shown in FIG. 14, a boundary node (nod 3) is inserted between a transit node (nod 2) and a newly created node (nod 1).

(2) Pattern 2: In the case of no occurrence of next node.

The pattern 2 is the case where, as a result of executing the processing of selecting the next node in the current node, there is no node to be read next. In this case, the new node is added as the child node of the present node.

Figure 16:
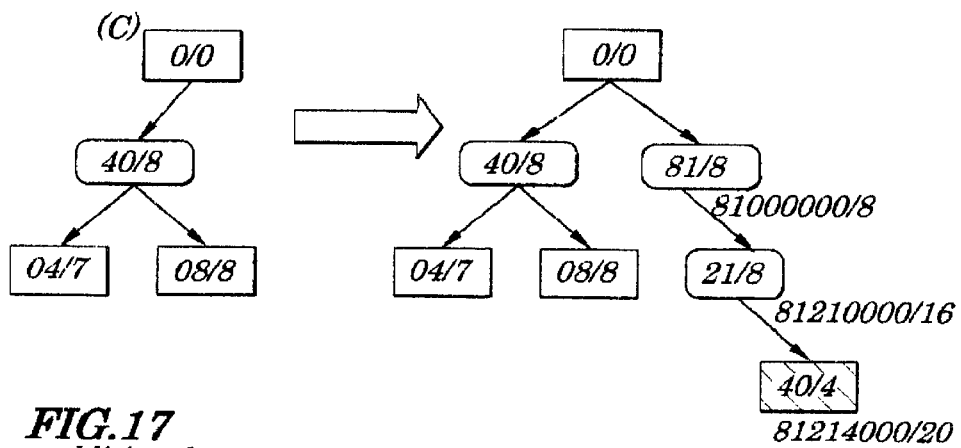
FIG. 16 is a diagram of a part on the path tree to explain an other example of the additional pattern 2 according to the first embodiment of the present invention.

The position where the new node is to be added is decided by results of evaluating the address of the new node using an evaluation bit of the current node. That is, if the evaluation result is "1", the new node becomes the right child node of the current node and, if the evaluation result is "0", the new node becomes the left child node of the current node. If there is the boundary of a byte between the current node and the new node, as shown in FIG. 16, the boundary node is inserted between the current node and the new node.

(3) Pattern 3: In a case where the mask length exceeds.

Figure 17:
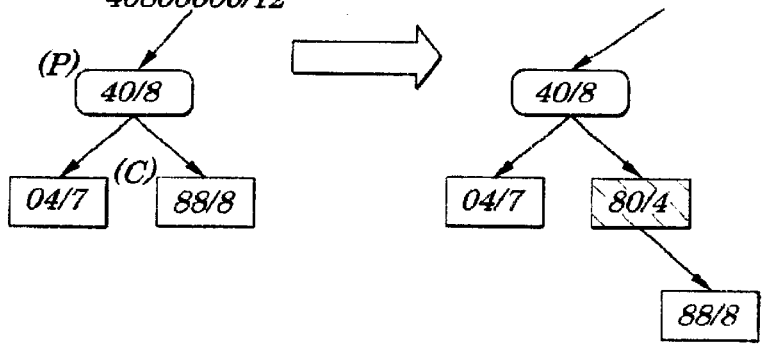
FIG. 17 is a diagram of a part of the path tree to explain one example of an additional pattern 3 according to the first embodiment of the present invention.

The pattern 3 is the case where, though the mask length of the current node exceeds the mask length of the newly added entry, results of the target mask address comparison show non-conformity as shown in FIG. 17. In this case, the new node is inserted between the mother node and the current node.

(4) Pattern 4: In a case where transit node exists.

Figure 18:
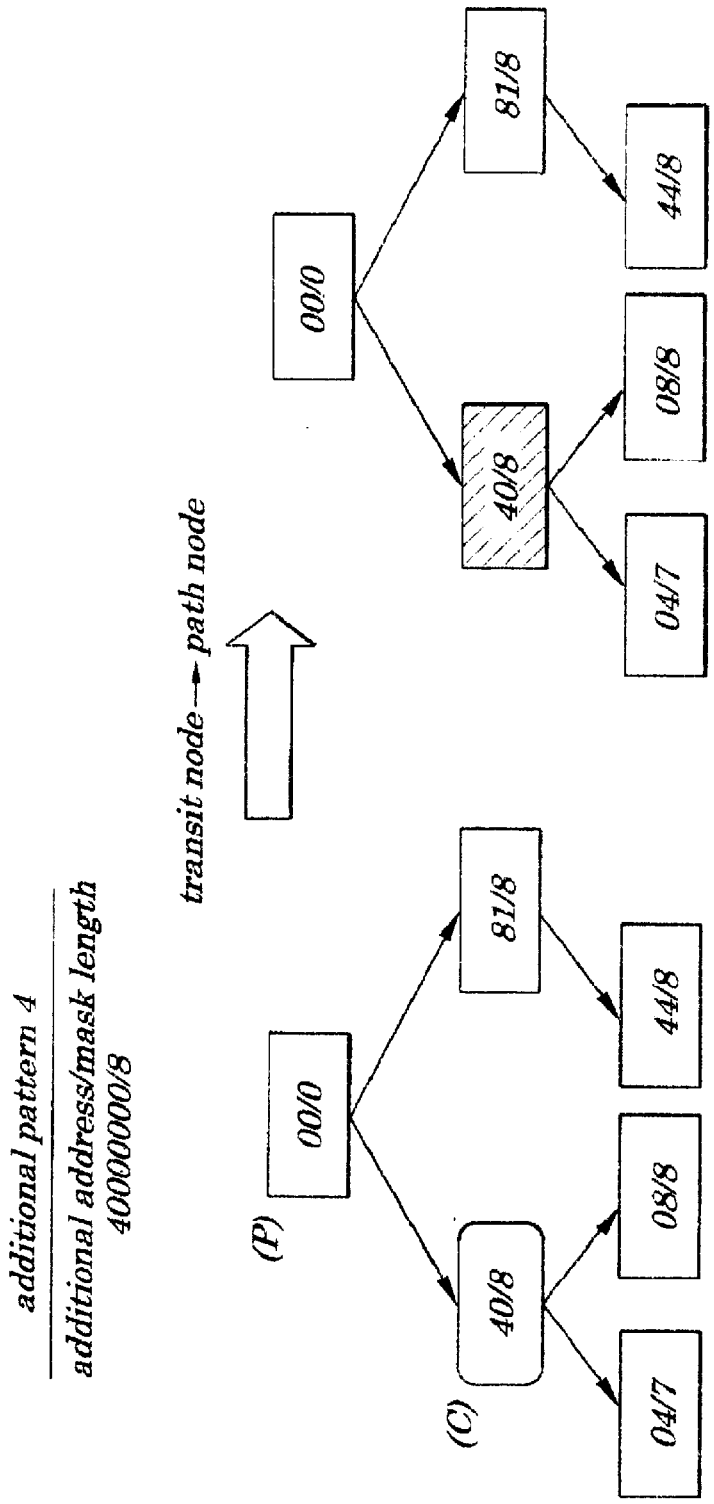
FIG. 18 is a diagram of a part of the path tree to explain one example of an additional pattern 4 according to the first embodiment of the present invention.

As shown in FIG. 18, the pattern 4 is the case where, the transit node or boundary node, having a same address as the newly added entry, is retrieved. In this case, the transit node or boundary node is replaced with the path node to be added.

Next, operations of adding the path node will be described below, by taking a case as an example of performing processing to add the retrieving IP address [85041200/24] to the path tree (RT1) by referring to FIGS. 2 and 3.

An "addition request" as a command (ICM), [8504C000] as an address and "20h" as the address length are inputted to the command receiving circuit 21 from the input/output device 1. The command receiving circuit 21 sets a command mode (CM) as an additional mode (CM2) and outputs a target address (TAD) [8504C000], target mask length "20" and retrieving start signal (SEAS). The operation mode deciding circuit 22, when receiving the retrieving start signal (SEAS) from the command receiving circuit 21, changes the operation mode (M) from the waiting mode (M0) to the retrieving mode (M1).

The entry retrieving circuit 23, when the operation mode (M) becomes the retrieving mode (M1), starts to retrieve the path node corresponding to the target address (TAD) [85041200] and target mask length (TMSK) "20".

As in the case of the retrieving processing described above, the node processing is made in order of the node 1, node 2, node 3, node 4 and node 5 and, at a position of the node 5, the node number (N) becomes "none" and the retrieving end pulse (SEAE) at a high (H) level is outputted. The address comparison result (ACR) shows conformity and the mask comparison result (MCR) shows the ordinary mask length. When the retrieving end pulse (SEAE) becomes "H", since the command mode (CM) is the addition mode (CM2), the operation mode deciding circuit 22 changes the operation mode (M) to the adding mode (M2).

The additional pattern deciding circuit 252 in the entry adding circuit 25, when the operation mode (M) becomes the adding mode (M2), judges the additional pattern to be the pattern 2 (the next node being "none"), since the address comparison result (ACR) shows conformity and the mask comparison result (MCR) shows ordinary mask length. The node storing memory renewing circuit 253, since the additional pattern is the pattern 2, creates the new path and adds the new node as the left child node of the current node.

Configurations and examples of operations of the entry deleting circuit 26 constituting the path retrieving circuit 2 shown FIG. 3 are hereinafter described. When an entry is deleted, the entry retrieving circuit 23 checks whether the path entry corresponding to the target address (TAD) and the target mask (TMSK) exist or not. If the path entry exists, the entry deleing circuit 26 deletes the corresponding path entry. If the corresponding path does not exist, the entry deleting circuit 26 notifies a failure of deleting the entry to the result outputting circuit 28.

Figure 19:
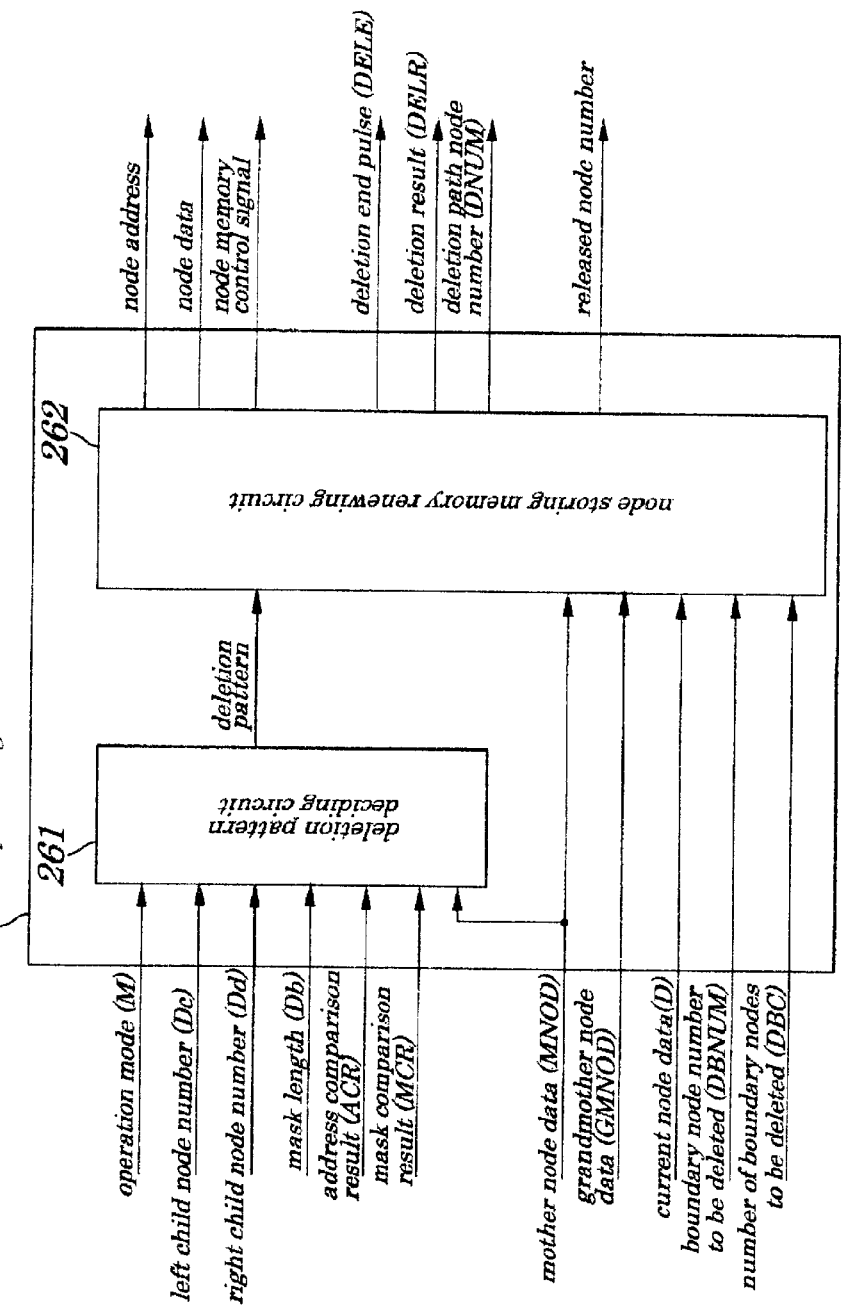
FIG. 19 is a schematic block diagram showing configurations of an entry deleting circuit constituting the path retrieving circuit shown in FIG. 3.

Next, configurations of the entry deleting circuit 26 will be described by referring to FIG. 19. As shown in FIG. 19, the entry deleting circuit 26 is composed of a deletion pattern deciding circuit 261 and a node storing memory renewing circuit 262.

The deletion pattern deciding circuit 261, when the operation mode (M) is changed to the deleting mode (M3), decides the deleting pattern. Determination of the deleting pattern is made based on the left child node number (Dc) being a node data (D) of the current node read from the node storing memory, right child node number (Dd), split mask length (Db), address comparison result (ACR) fed from the entry retrieving circuit 23, path valid flag (De), mother node path valid flag (MDe) in the mother node data inputted from the node data holding circuit 24 and mask comparison result (MCR).

As a result, the deletion pattern includes the following five kinds of patterns:

(1) Pattern 0: (In a Case of a Failure of Deletion.)

The pattern 0 is the case where any one of the following conditions from 1 to 3 is met. In this case, since no path node to be deleted exists in the path tree, the processing of deletion is judged to be the failure.

1. Address comparison result (ACR) shows non-conformity.
2. Mask comparison result (MCR) shows the same mask length.
3. Path valid flag (De) is invalid, that is, the current node is not the path node.

Moreover, in the case of no pattern 0, the deleting pattern is decided to be any one of the following patterns 1 to 4, based on the number of child nodes (CHNUM) held by the current node, mask length (Db), mother node path valid flag (MDe). Furthermore, the number of the child nodes (CHNUM) can be judged depending on whether the left child node number (Dc) and the right child node number (Dd) is the valid node number or not.

(2) In a Case of Pattern 1:
The pattern 1 is the case where the number of the child nodes (CHNUM) is "2" or the case where the number of the child nodes (CHNUM) is "1" and the mask length (Db) is "8".

(3) In the Case of Pattern 2:
The pattern 2 is a case where the number of the child nodes (CHNUM) is "1" and the split mask length (Db) is a length other than "8".

(4) In a Case of Pattern 3:
The pattern 3 is the case where the number of the child nodes (CHNUM) is "0" and the path valid flag (De) of the mother node (MDe) is valid.

(5) In a Case of Pattern 4:
The pattern 3 is the case where the number of the child node (CHNUM) is "0" and the mother node path valid flag (MDe) is invalid.

Moreover, the node storing memory renewing circuit 262 renews contents of the path node storing memory in accordance with the deleting pattern which has judged the deletion pattern deciding circuit 261.

Next, a path deletion algorithm will be described. When an entry is deleted, in the entry retrieving processing, whether the path node corresponding to the target address (TAD) and the target mask (TMSK) exist or not is checked. If a result or checking indicates that the above path node exists, in the entry deleting circuit 26, the corresponding entry is deleted. If the corresponding path does not exist, the entry deleting circuit 26 informs the result outputting circuit 28 of the failure in deleting the entry.

The entry deleting pattern in the entry deleting circuit 26 is decided based on the following three points (1) to (3) and includes the following four patterns (A) to (B), in which the case of the failure in the deletion is excluded.

(1) How many child node does the current node (cnode) have.
(2) Whether the mother node (mnode) is a path node or a transit node.
(3) Whether the mask length of the current node (cnode) is "8".

Figure 22:
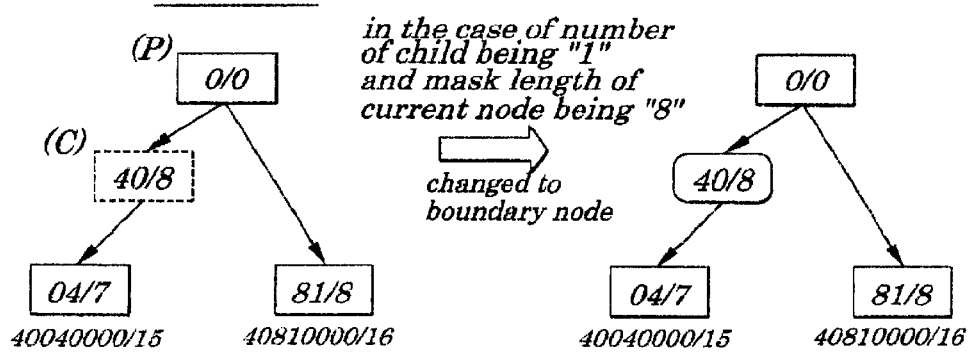
FIG. 22 is a diagram showing a part of the path tree to explain an other example of the deletion pattern 1 according to the first embodiment of the present invention.

(A) In a Case of Pattern 1:
The pattern 1 is the case where the current node has two child nodes or the case where the current node has one child node and its mask length can be divided by 8. In this case, the current node is replaced with the transit node. Moreover, as shown in FIG. 22, the pattern 1 includes a case where the current node has one child node and its mask length can be divided by 8. In this case, the current node is replaced with the boundary node.

Figure 23:
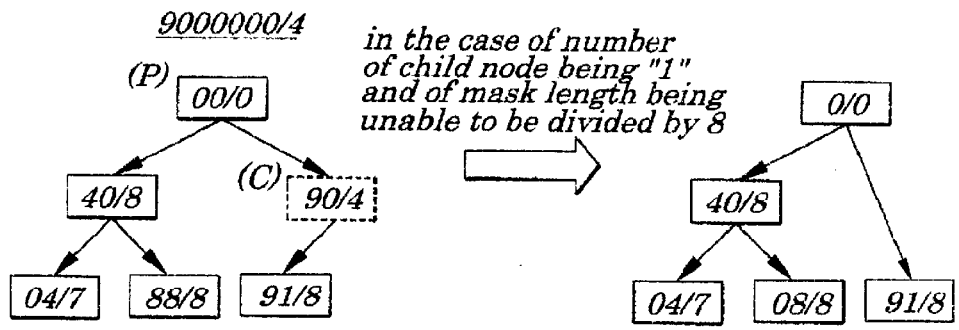
FIG. 23 is a diagram showing a part of the path tree to explain one example of a deletion pattern 2 according to the first embodiment of the present invention.

(B) In a Case of Pattern 2
The pattern 2 is the case where the current node has one child node and its mask length cannot be divided by 8, as shown in FIG. 23. In this case, the child node of the current node is connected as the child node of the mother node and the current node is deleted. Moreover, a relationship between a newly set mother node and the child node is the same as the relationship between the current node and the child node.

Figure 24:
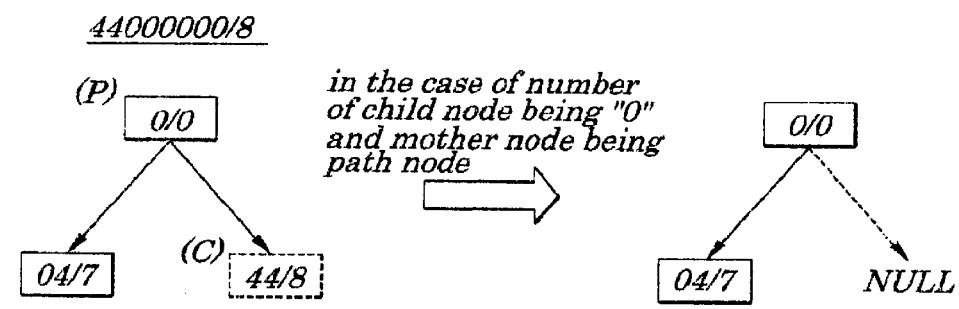
FIG. 24 is a diagram showing a part of the path tree to explain one example of a deletion pattern 3 according to the first embodiment of the present invention.
Figure 25:
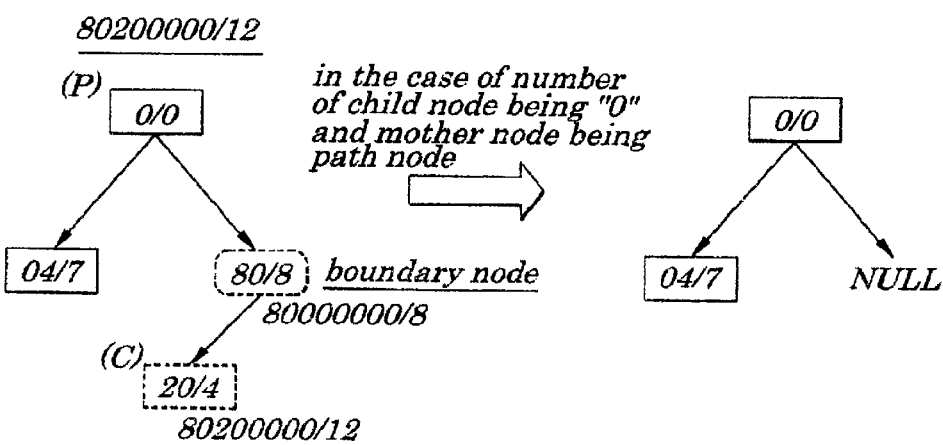
FIG. 25 is a diagram showing a part of the path tree to explain an other example of the deletion pattern 3 according to the first embodiment of the present invention.

(C) In a Case of Pattern 3
The pattern 3, as shown in FIG. 24 or 25, is the case where the current node has no child node and the mother node is the path node. In this case, the current node and all boundary nodes existing between the mother node and the current node are deleted.

Figure 26:
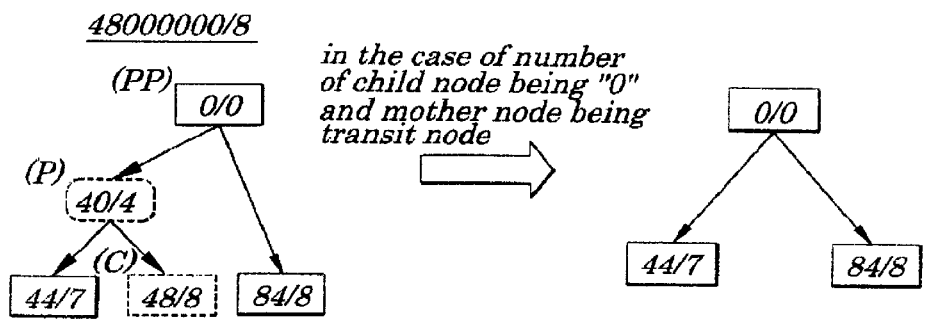
FIG. 26 is a diagram showing a part of the path tree to explain one example of a deletion pattern 4 according to the first embodiment of the present invention.
Figure 27:
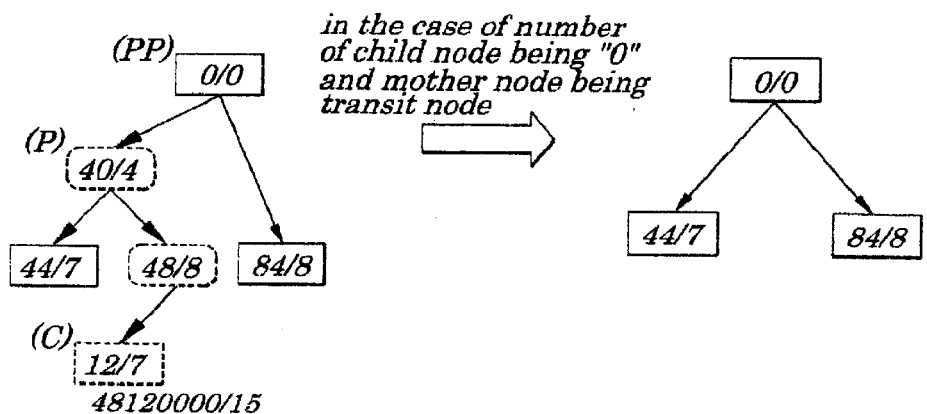
FIG. 27 is a diagram showing a part of the path tree to explain an other example of the deletion pattern 4 according to the first embodiment of the present invention.

(D) In a Case of Pattern 4
The pattern 4, as shown in FIGS. 26 and 27, is the case where the current node has no child node and the mother node is the transit node or a boundary node. In this case, the current node and the mother node and all boundary nodes existing between the current node and the mother node are deleted. In this case, the brother node being not the node to be deleted out of child nodes of the mother node is connected as the child node of the grandmother node. The relationship between the newly set grandmother node and the brother node is the same as that between the previous grandmother and the mother node.

Next, the deleting operation is described by taking a case as an example in which the retrieving IP address [8504000/16] is deleted in the path tree (RT1) in FIG. 2. A deletion request as the command (ICM) and [85040000] as an address (IAD) and "16" as the address length are inputted to the command receiving circuit 21 from the input/output device 1.

The command receiving circuit 21 sets the command mode (CM) to the addition mode (CM2) and outputs the target address (TAD) [85040000] and the target mask length "16" together with the retrieving start signal (SEAS).

The entry retrieving circuit 23, when receiving the retrieving start signal (SEAS) from the command receiving circuit 21, starts retrieving path node corresponding to the target address (TAD) [85041200] and target mask length (TMSK) "20". In this case, in a same manner as the example of retrieving the path, after the node processing has been made in order of the node 1, node 2, node 3, node 4 and node 5 and, at a position of the node 5, since the node number (N) becomes "none" and the mask comparison result (MCR) shows the same mask length, the retrieving end pulse (SEAE) at the high (H) level is outputted. The address comparison result (ACR) shows the conformity and the mask comparison result (MCR) shows the same mask length.

The operation mode deciding circuit 22, when the retrieving end pulse (SEA) becomes high "H", since the command mode (CM) is the deleting mode (CM3), changes the operation mode (M) to the deleting mode (M3).

The deletion pattern deciding circuit 261 embedded in the entry deleting circuit 26, when the operation mode (M) becomes the deleting mode (M3), since the address comparison result (ACR) shows the non-conformity and the mask comparison result (MCR) shows the same mask length, recognizes that it has found an entry to be deleted and, since the left child node number (Dc) of the current node is "none" and the right child node number (Dd) of the current node is also "none", recognizes also that the number of child nodes of the current node is 0 (zero) and further since the mother node path valid flag (MDe) is invalid, judges that the deletion pattern is "4" described above.

The node storing memory renewing circuit 262 in the entry deleting circuit 26, since the number of boundary nodes of the node data holding circuit 24 is 0 (zero), recognizes that the deletion of the boundary node is not required. The node storing memory renewing circuit 262 outputs the node 5 of the current node and the node 4 of the mother node are outputted as a release node number. The node storing memory renewing circuit 262, since a next selection bit of the grandmother node (node 3) is 0 (zero), renews node data of the grandmother node so that a left child node number (Dc) of the grandmother node is changed to the brother node (node 6).

Second Embodiment

Figure 28:
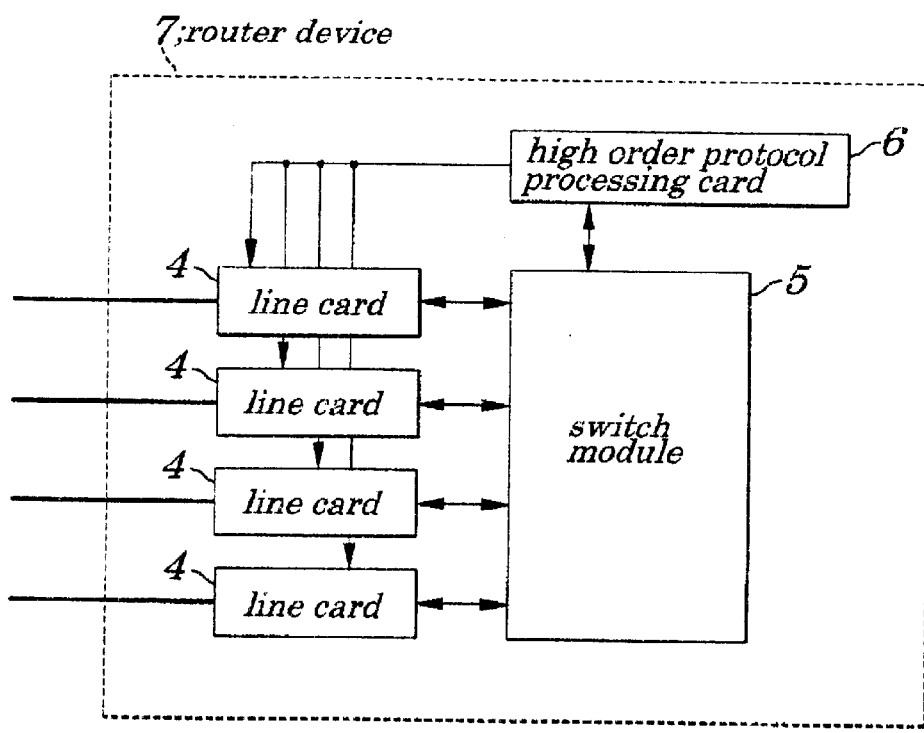
FIG. 28 is a schematic block diagram showing configurations of a router serving as a communication control device according to a second embodiment of the present invention.

A router device 7 as a communication device according to a second embodiment of the present invention will be described by referring to FIG. 28. As shown in FIG. 28, the router device 7 is composed of a line card 4, a switch module 5 and a high order protocol processing card 6.

The line card 4 is operated to send and receive a packet from a transmission path. The switch module 5 is operated to establish a connection among two or more line cards and between the high order protocol processing card 6 and to transfer packet and control information to a card of a destination in accordance with a request for connecting each card.

The high order protocol processing card 6 has a function to process a protocol of a high layer such as a routing protocol. If a change occurs in a path table, information set in the path table is transferred through a control bus to the line card 4.

Figure 29:
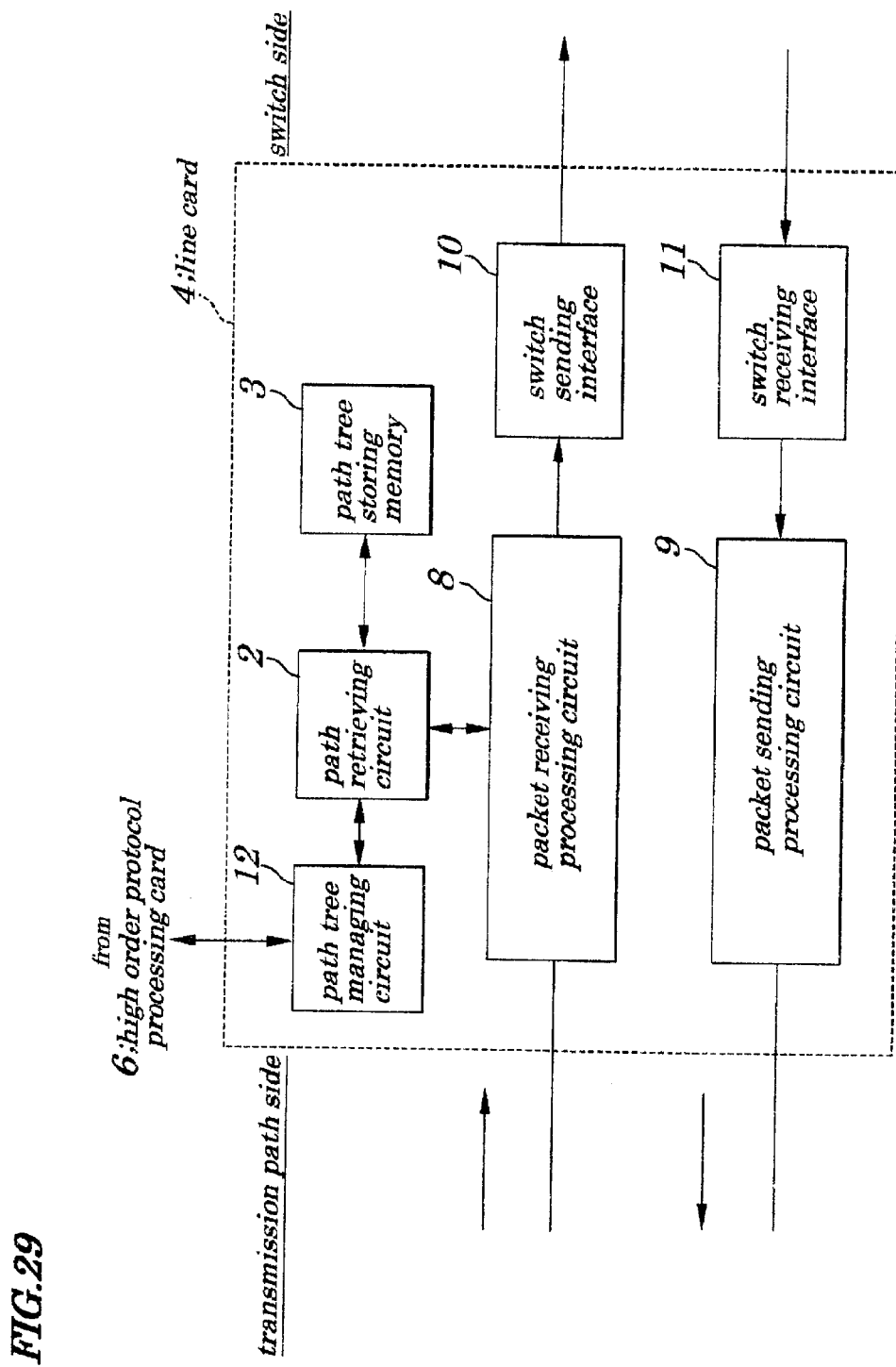
FIG. 29 is a schematic block diagram explaining configurations of a line card constituting the router shown in FIG. 28.
Figure 30:
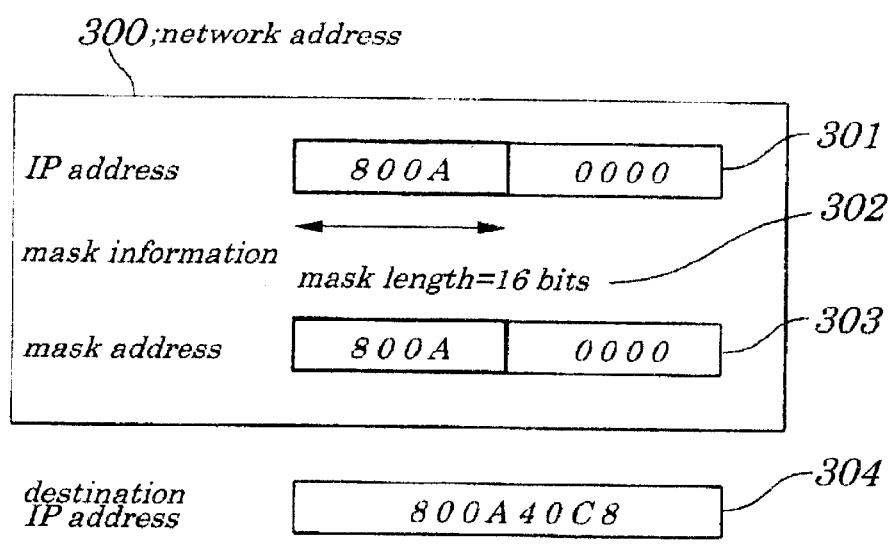
FIG. 30 is an example of a conventional network address.
Figure 31:
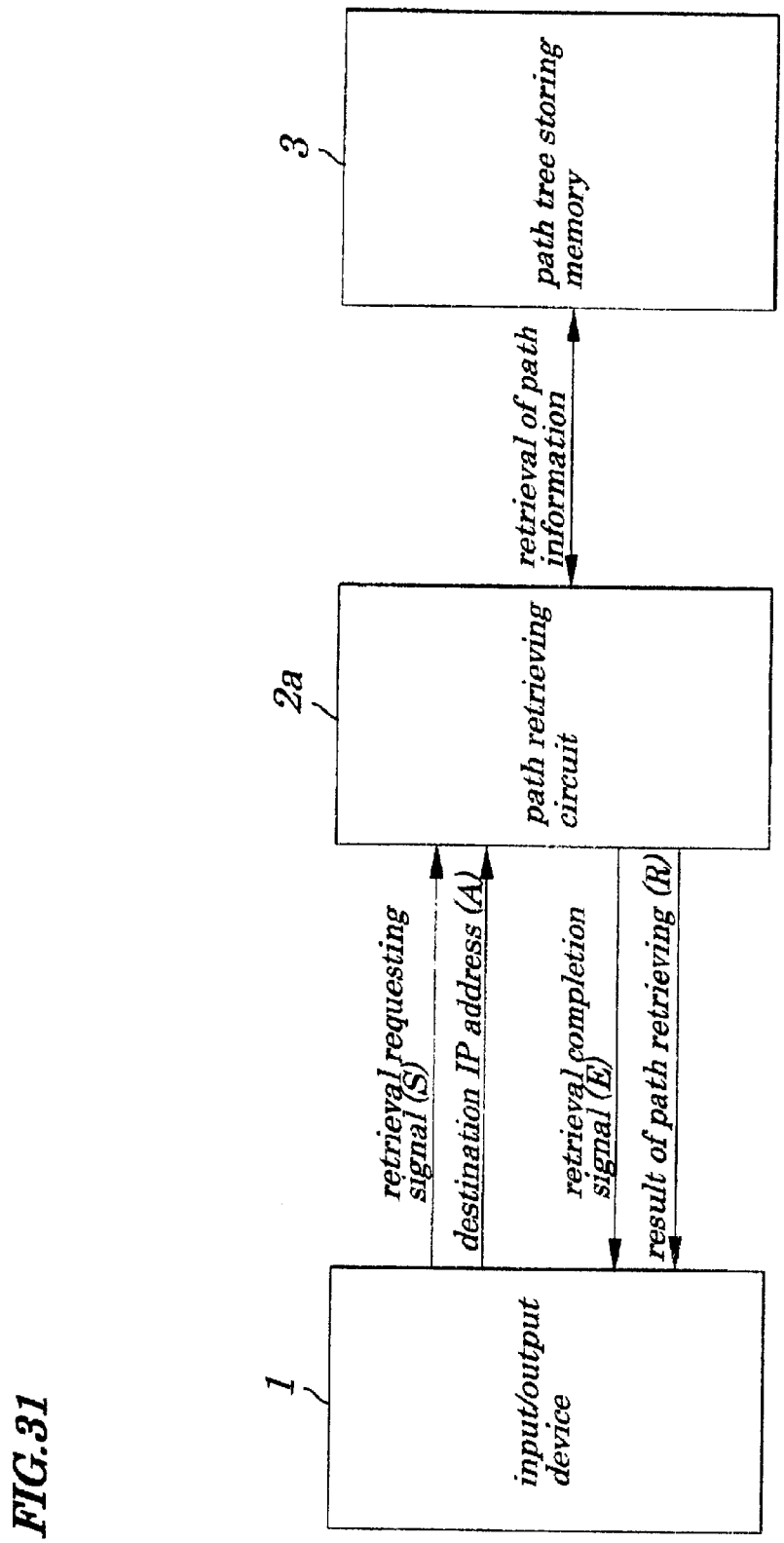
FIG. 31 is a schematic block diagram showing configurations of a communication control unit.

FIG. 29 is a schematic block diagram of the line card 4. As shown in FIG. 29, the line card 4 is composed of a packet receiving processing circuit 8, a packet sending processing circuit 9, a switch sending interface 10, a switch receiving interface 11, a path tree managing circuit 12, a path retrieving circuit 2 and a path tree storing memory 3. The packet receiving processing circuit 8 performs receiving of a packet from a transmission path. The packet receiving processing circuit 8 decides a destination corresponding to a destination address in the packet and outputs the packet and information about the destination to the switch sending interface 10. The packet is transferred to a switch module 5 from the switch sending interface 10 and then is outputted to the switch receiving interface 11 designated by the switch sending interface 10. The packet that has reached the switch receiving interface 11 is transferred to the packet sending processing circuit 9 and is then sent to the transmission path.

The path tree managing circuit 12 receives requests for adding, deleting and changing a path and requests the path retrieving circuit 2 to add, delete or change the path. The packet receiving processing circuit 8 and the path tree managing circuit 12 shown in FIGS. 28 and 29 function as an input/output device. Operations of retrieving, adding and deleting according to the second embodiment are same as those according to the first embodiment and therefore detailed description is omitted.

As described above, according to the present invention, each node of a path tree is represented by a split address and split mask length and an address to be retrieved is split and a split retrieving address is produced and split bits are compared sequentially, thus allowing the destination address to be retrieved without using an address length to be retrieved, that is, the destination address to be retrieved may be a variable-length address.

Moreover, according to the present invention, each node is represented by the split address and split mask length. Therefore, a memory size required to store data of the node may be more reduced when compared with a case in which each node is represented by a real address or a real mask length.

Furthermore, according to the present invention, since data of each node is stored as the split address even if the address entered is long, the memory size can be reduced.

Also, according to the present invention, the node is retrieved by splitting the address to be retrieved, allowing each node to be retrieved depending on a scale of a circuit corresponding to a number of bits of the split retrieving address and allowing configurations of the circuit to be more small-scaled when compared with a case in which the node is retrieved depending on a size of the real address or real mask length.

Also, according to the present invention, even if the retrieving address is long, each node can be retrieved depending on the scale of the circuit corresponding to the number of bits of the split retrieving address, thus allowing configurations of the circuit to be small-sized.

Also, according to the present invention, the processing of retrieving the node is performed by the split retrieving address represented by the split address or split mask length. Therefore, the number of bits to be retrieved for every node can be more reduced when compared with the case where the retrieving is performed based on the actual retrieving address, thus allowing high speed processing of retrieving each node.

Furthermore, according to the present invention, even if the retrieving address is long, the number of bits to be retrieved can remain the number of bits of the split retrieving address. This also allows time required to retrieve each node to be shortened even if the retrieving address is long. Therefore, even if the retrieving address is long, a high speed retrieving can be achieved.

It is apparent that the present invention is not limited to the above embodiments but may be changed and modified without departing from the scope and spirit of the invention. For example, in the above embodiments, the processing of the entry retrieving circuit is simplified by setting off the retrieving address by one byte, however, the present invention is not limited to the method in which the retrieving address is set off by one byte, that is, the retrieving address may be arbitrarily set off depending on a circuit scale and processing speed. The retrieving address may be set off by every 2 bytes or 4 bits.

Moreover, in the above embodiments, retrieving of the path is performed by notifying a node number of a path entry, however, a communication control unit may be so configured that a management table related to concrete path information such as a MAC address, a VCI (virtual channel identification) of the ATM or a like is prepared which is controlled by the path retrieving circuit and path information may be outputted directly to the input/output device. However, in this case, updating of the management table is required at a time of adding and deleting the path. If the path information only is changed, updating of the management table is required. Furthermore, in the above embodiments, an IP address is used in order to explain an algorithm, configurations and operations of the path retrieving circuit 2, however, it is not necessarily equivalent to the IP address being used actually in an internet backbone.

Finally, the present application claims the priority of Japanese Patent Application No. Hei11-162551 filed on Jun. 9, 1999, which is herein incorporated by reference.

What is claimed is:

1. A communication control unit comprising:
    a memory device storing a path table corresponding to a path tree used to retrieve a place to which received packet data is transferred, wherein a node constituting said path tree is represented by a split address containing a least significant bit of a valid address of a real address out of each of said split addresses obtained by setting off said real address of said node by each specified bit starting from its high order portion and by a split mask length showing a number of bits of said valid address portion of said real address;

a path retrieving circuit composed of a retrieval data managing circuit, a next node selecting circuit and a path renewing circuit, wherein said retrieval data managing circuit is operated to produce a split retrieving address composed of two or more stages obtained by setting off said retrieving address showing a destination of received packet data by each said specified bit and, at a same time, to generate a bit string for selection composed of the bit string obtained by displacing the bit string of said split retrieving address by one bit toward a low order portion on said retrieving address, wherein said next node selecting circuit is operated to decide a next node to be retrieved based on the bit having a value being equivalent to a value of a length of high order split mask contained in said bit strings for selection and wherein said path renewing circuit is operated to compare a valid address portion being equivalent to a number of bits represented by the length of said high order split mask contained in split addresses showing said node decided by said next node selecting circuit with the bit string being equivalent to the number of bits represented by the length of said high order split mask contained in split retrieving addresses outputted from said retrieval data managing circuit and if comparison results conform to each other, to hold path information corresponding to said node and to output path information being held at a time of termination of said retrieving as a place to which said received packet data is to be transferred.

2. The communication control unit according to claim 1, wherein said path tree corresponding to said path table stored in said memory device has said node with its split mask length being equivalent to said specified number of bits on a path establishing a connection among nodes represented by different split bit strings and wherein said retrieval data managing circuit, when said node to be compared in said path renewing circuit is renewed from said node with said split mask length being equivalent to said specified number of bits to said next node, is operated to update said split retrieving address and said bit string for selection to be outputted to said path renewing circuit so as to exist at a next stage.

3. The communication control unit according to claim 2, wherein said node is composed of a path node corresponding to path information showing said place to which said packet data is to be transferred, a transit node not corresponding to path information, having said split mask length being equivalent to a value less than said specified number of bits and serving as a branch point between two nodes and a boundary node not corresponding to path information, having said split mask length being equivalent to said specified number of bits and not serving as said branch point.

4. The communication control unit according to claim 1, further comprising a mask length comparing circuit operated to compare a real mask length showing said valid address of said retrieving address and said number of bits of said valid address of said real address of said node to be retrieved.

5. The communication control unit according to claim 1, further comprising a retrieval end identifying circuit operated to judge said retrieving to be terminated when there is no next node to be selected in said next node selecting circuit or when comparison results do not conform to each other in said path renewing circuit.

6. The communication control unit according to claim 4, further comprising a retrieval end identifying circuit operated to judge said retrieving to be terminated when said valid address of said retrieving address is longer than said valid address of said real address of said node to be retrieved.

7. The communication control unit according to claim 2, further comprising a mask length comparing circuit operated to compare a real mask length showing said valid address of said retrieving address and said number of bits of said valid address of said real address of said node to be retrieved.

8. The communication control unit according to claim 3, further comprising a mask length comparing circuit operated to compare a real mask length showing said valid address of said retrieving address and said number of bits of said valid address of said real address of said node to be retrieved.

9. The communication control unit according to claim 1, wherein said next node selecting circuit is composed of a first selector operated to select a bit represented by said split mask length out of said specified number of bits and a second selector operated to select one node as said next node out of maximum two nodes based on a value of a bit selected by said first selector.

10. The communication control unit according to claim 1, wherein said path renewing circuit is composed of a mask processing circuit into which said split mask length of said split address showing said node decided by said next node selecting circuit and said split retrieving address are inputted and which is operated to extract said bit string being equivalent to said number of bits represented by said split mask length from said high order portion of said split retrieving address, an address comparing circuit operated to compare said extracted bit string with said valid address portion being equivalent to said number of bits represented by said split mask length out of said high order portion of said split address and a path information renewing circuit operated to hold said path information corresponding to said node if said comparison results conform to each other and to output said path information held at a time of termination of said retrieving as said place to which said received packet data is to be transferred.

11. The communication control unit according to claim 1, further comprising an entry adding circuit operated to add a node of an additional entry to said place retrieved as an addition position by said path retrieving circuit in said path tree.

12. The communication control unit according to claim 1, further comprising an entry deleting circuit operated to delete a node corresponding to said place retrieved as a deletion position by said path retrieving circuit in said path tree.

* * * * *